(12) United States Patent
Lethorn

(10) Patent No.: US 10,968,967 B2
(45) Date of Patent: Apr. 6, 2021

(54) BRAKE RETRACTION SPRING ASSEMBLY

(71) Applicant: AKEBONO BRAKE INDUSTRY CO., LTD., Tokyo (JP)

(72) Inventor: Brad Robert Lethorn, Brighton, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 225 days.

(21) Appl. No.: 16/187,048

(22) Filed: Nov. 12, 2018

(65) Prior Publication Data

US 2020/0149602 A1 May 14, 2020

(51) Int. Cl.
*F16D 65/097* (2006.01)
*F16D 55/228* (2006.01)
*F16D 55/00* (2006.01)

(52) U.S. Cl.
CPC ....... *F16D 55/228* (2013.01); *F16D 65/0978* (2013.01); *F16D 2055/0029* (2013.01)

(58) Field of Classification Search
CPC ............. F16D 65/0974; F16D 65/0975; F16D 65/0976; F16D 65/0977; F16D 65/097; F16D 55/228
See application file for complete search history.

(56) References Cited

U.S. PATENT DOCUMENTS

| | | | |
|---|---|---|---|
| 4,364,455 A | 12/1982 | Oshima | |
| 4,491,204 A | 1/1985 | Dirauf et al. | |
| 5,249,647 A | 10/1993 | Kobayashi et al. | |
| 5,511,638 A | 4/1996 | Tsuruta | |
| 5,537,103 A | 7/1996 | Lavelle et al. | |
| 6,378,665 B1 | 4/2002 | McCormick et al. | |
| 6,920,965 B2 | 7/2005 | Burgdorf et al. | |
| 7,308,974 B2 | 12/2007 | Barbosa et al. | |
| 7,467,693 B2 | 12/2008 | Barbosa et al. | |
| 8,393,441 B2 | 3/2013 | Gutelius | |
| 8,397,880 B2 | 3/2013 | Chelaidite | |
| 9,261,152 B2 | 2/2016 | Gutelius et al. | |
| 2002/0189911 A1 | 12/2002 | Layton et al. | |
| 2013/0025981 A1 | 1/2013 | Maehara et al. | |

(Continued)

FOREIGN PATENT DOCUMENTS

| | | |
|---|---|---|
| JP | 56021633 U | 12/1980 |
| JP | 2010203559 A * | 9/2010 |

*Primary Examiner* — Bradley T King
(74) *Attorney, Agent, or Firm* — The Dobrusin Law Firm, P.C.; Daniela M. Thompson-Walters

(57) ABSTRACT

A retraction spring assembly having: a) pad clip having a lock channel and one or more assembly locks; b) a retraction spring affixed to the pad clip with two or more lock arms residing within the lock channel and a plurality of energy storage portions; and first and second retraction arms; wherein the one or more assembly locks are configured to receive the two or more lock arms and bias the retraction spring into an assembly position; during the brake apply, movement of the first and second retraction arm is toward each other and results in energy being stored in the body portion; and during the brake release, the energy stored in the body portion is released and transferred to both the first and second retraction arm to result in movement of the first retraction arm and the second retraction arm away from each other.

20 Claims, 5 Drawing Sheets

(56) References Cited

U.S. PATENT DOCUMENTS

| | | | |
|---|---|---|---|
| 2015/0101895 A1* | 4/2015 | Ueda | F16D 55/228 |
| | | | 188/72.4 |
| 2015/0211589 A1* | 7/2015 | Mallmann | B21D 53/36 |
| | | | 188/18 A |
| 2019/0085921 A1* | 3/2019 | Reuss | F16D 55/2262 |
| 2019/0203788 A1* | 7/2019 | Sekiguchi | F16D 55/227 |
| 2019/0234472 A1* | 8/2019 | Wilson | F16D 65/22 |

* cited by examiner

BRAKE RETRACTION SPRING ASSEMBLY

FIELD

The present teachings generally relate to a brake system, and more particularly to a retraction spring assembly which assists in retracting brake pads. The retraction spring assembly may be particularly advantageous in preventing tilting of one or more brake pads during a brake release or brake apply.

BACKGROUND

Typical disc brake systems include a support bracket, two or more brake pads, a caliper, and a rotor. The two or more brake pads are mounted and located adjacent to the support bracket so that the brake pads move axially toward and away from the rotor. The disc brake system may include a pad clip that attaches to the support bracket and to a portion of one or more of the brake pads so that the brake pads are held in the support bracket. The disc brake system may include one or more springs that attach to the brake pads and pad clips to assist in retracting the brake pads. The spring and pad clip form a retraction spring assembly. The addition of one or more pad clips and/or one or more springs may require modifications to be made to the support bracket, brake pads, caliper, or combination thereof so that the spring and/or pad clip may be used. In addition, these springs may not be used with existing braking systems because the spring does not fit without the modifications discussed above. Examples of springs, clips, and other retraction devices are disclosed in U.S. Pat. Nos. 4,364,455; 4,491,204; 5,249,647; 5,511,638; 5,537,103; 6,378,665; 6,920,965; 7,308,974; 7,467,693; 8,393,441; 8,397,880; and 9,261,152; U.S. Patent Application Nos. 2002/0189911; PCT Publication No. WO 2011/126125; and Japanese Patent No. 56021633U, all of which are expressly incorporated herein by reference for all purposes.

One challenge faced by brakes is providing a reaction point between a brake pad and a retraction spring which limits tilting or rotation about the reaction point during a brake release or brake apply. During a brake apply, a piston and brake pad typically move axially toward the rotor to generate the brake force. During a brake release, a brake pad typically moves axially away from the rotor to release the brake force. In these configurations, a reaction point may be created at the surface of the brake pad in contact with the retraction spring. If the reaction point is located above or below a height of a piston adjacent to the brake pad, the axial force of the piston upon the brake pad causes the brake pad to tilt or rotate about the adjacent piston. For example, if a reaction point on a brake pad is located above a height of an adjacent piston, during a brake apply or brake release, the brake pad pivots about the upper surface of the piston. The pivoting motion may result in a drag force generated between the brake pad and rotor, even during a brake release. A drag force may cause uneven wear in the brake pad, increased fuel consumption, or even brake squeal and rattle. Dedicated retraction spring assemblies (e.g., separate retraction springs and pad clips per brake pad may provide for contact between a brake pad and a retraction spring within a contact surface defined by a height of the piston, such as the retraction spring assembly of U.S. patent application Ser. No. 15/711,493. Notwithstanding the above, there is still a need for a retraction spring which is able prevent tilting of opposing brake pads, extend over a rotor gap, and/or contact opposing brake pads within a contact region defined within a height of an adjacent piston.

Another challenge which can be faced by one-piece retraction springs which extend over a rotor gap is the retraction spring may interfere with assembly of a brake. Generally, these one-piece retraction springs have two retraction arms. The retraction spring assembly is typically installed prior to a rotor residing within a rotor gap and may even be installed before the opposing brake pads. The two retraction arms may then reside within the rotor gap. Typically, to avoid interference of the retraction arms with the installation of the brake pads, the retraction arms are designed to contact the brake pads along an upper region of an inner facing surface. The contact in the upper region may result in the tilting or pivoting motion of the brake pads during axial movement. Thus, there is a need for a one-piece retraction spring which is able to be installed prior to the brake pads while preventing interference during assembly of the brake pads.

SUMMARY

The present disclosure relates to a retraction spring assembly comprising: a) a pad clip having: i) a lock channel; ii) one or more assembly locks; b) a retraction spring affixed to the pad clip, wherein the retraction spring stores energy during a brake apply and releases the energy during a brake release and comprises: i) a body portion having two or more lock arms residing within the lock channel, and a plurality of energy storage portions; ii) a first retraction arm and a second retraction arm, each integrally connected to the body portion via one of the plurality of energy storage portions; wherein the one or more assembly locks are configured to receive the two or more lock arms and bias the retraction spring into an assembly position in which the first retraction arm and the second retraction arm biased toward each other; wherein during the brake apply, movement of the first retraction arm and the second retraction arm is toward each other, toward a rotor, or toward both and results in energy being stored in the body portion; and wherein during the brake release, the energy stored in the body portion is released and transferred to both the first retraction arm and the second retraction arm to result in movement of the first retraction arm and the second retraction arm away from each other, away from the rotor, or away from both.

The present disclosure further relates to a brake system comprising: a) one or more retraction spring assemblies having: i) one or more pad clips having a lock channel and one or more assembly locks; and ii) one or more retraction springs engaged with the one or more pad clips, wherein the one or more retraction springs include: a body portion having two or more lock arms residing within a lock channel of the pad clip, and a plurality of energy storage portions; a first retraction arm and a second retraction arm, each integrally connected to one of the two or more lock arms via one of the plurality of energy storage portions; b) two or more pistons which are opposing one another, wherein each piston includes: i) an apply end facing toward a rotor gap; ii) a height defined by a distance between an upper surface and lower surface of each of the pistons; c) two or more brake pads with the rotor gap therebetween, each having a contact region across a width of an inner surface of the brake pad which is defined by the upper surface and the lower surface of at least one of the two or more pistons which are adjacent; wherein the retraction spring stores energy during a brake apply and releases the energy during a brake release; wherein the retraction spring is configurable into one or more engaged positions during the brake apply and the brake release so that the first and second retraction arms are each in direct contact with one of the inward facing surfaces of a brake pad within the contact region; and wherein the one or more assembly locks are configured to receive the two or more lock arms and bias the retraction spring into an assembly position in which the first retraction arm and the second retraction arm are biased toward each other and free of contact with the inward facing surfaces of the two or more brake pads.

The present disclosure further relates to a method of assembly a retraction spring assembly into a brake system, comprising: (a) inserting one or more portions of a caliper, support bracket, pressure plate or any combination thereof into one or more channels of a pad clip; (b) configuring the retraction spring into an assembly position; (c) installing one or more pressure plates into the brake system; (d) configuring the retraction spring into one or more engagement positions so one or more retraction arms contact the one or more brake pads.

The retraction spring assembly of the present disclosure may provide a retraction spring which is able to prevent tilting of one or more brake pads during a brake apply and/or brake release. The retraction spring assembly of the disclosure may contact a brake pad at a reaction point within a contact region of the brake pad defined within a height of an adjacent piston. The retraction spring assembly of the present disclosure may provide a retraction spring which is able to extend over a rotor gap while contacting opposing brake pads. The retraction spring assembly may have an assembly position in which one or more retraction arms may be biased to allow for assembly of one or more brake pads without interference.

DETAILED DESCRIPTION

Figure 1:
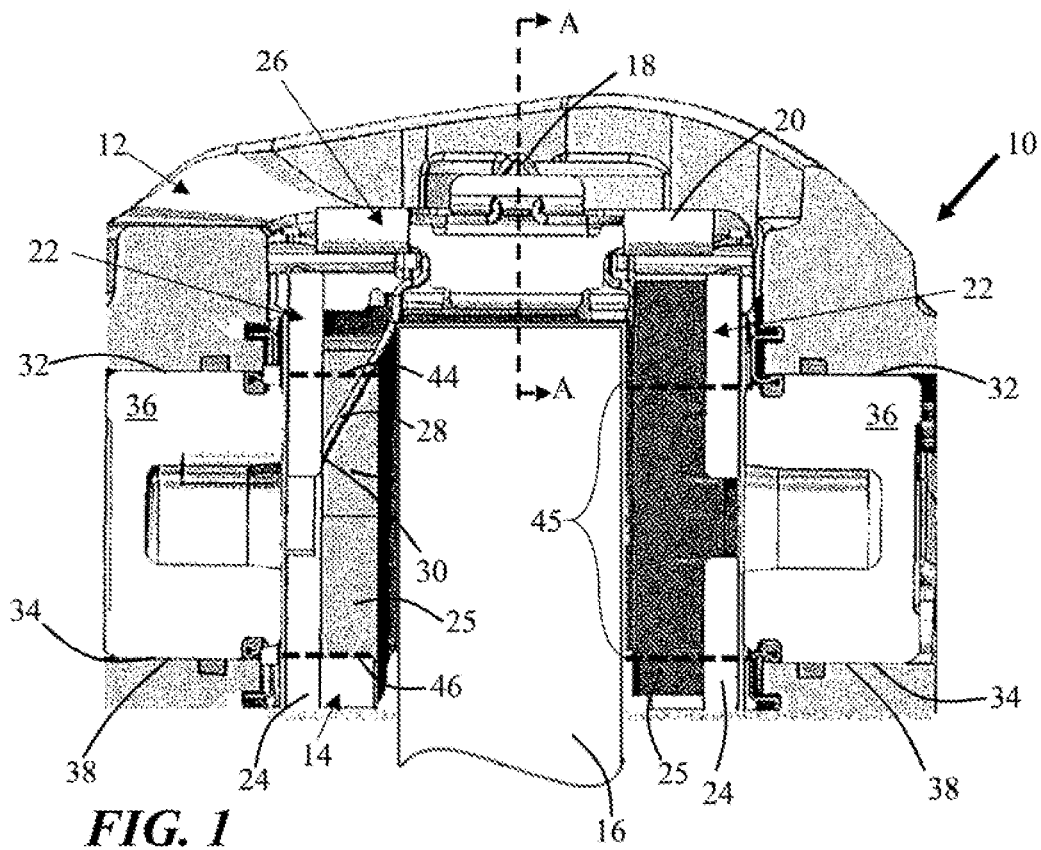
FIG. 1 illustrates a cross-section of a brake system.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a retraction spring assembly for use with a brake system in vehicles. The retraction spring assembly may be used with almost any brake system and the brake system may be used with almost any vehicle. A vehicle may include a car, truck, bus, train, airplane, or the like. Alternatively, the retraction spring assembly and brake system may be integrated into components used for manufacturing or other equipment that requires a brake, such as a lathe, winder for paper products or cloth, amusement park rides, or the like. The present teachings may be most suitable for use with a passenger vehicle, such as a car, truck, sports utility vehicle, or the like.

Generally, a disc brake system includes a caliper, a rotor, two or more brake pads, and two or more pistons. The caliper is in communication with one or more inner brake pads and one or more outer brake pads located on opposing sides of the rotor. The brake pads typically include a pressure plate and a friction material, with the friction material adjacent to the rotor. The brake pads may be held in communication with a support bracket of the caliper by one or more pad clips. A support bracket may be separate from and connected to a caliper or may be integral with a caliper. The caliper, support bracket, or both may include one or more features for engaging a pad clip. The one or more features may include one or more projections, grooves, indents, notches, tabs, bores, channels, the like, or any combination thereof. The support bracket and caliper may include one or more abutments and/or projections which project from the support bracket surface and/or caliper surface and are received within one or more channels of a pad clip. A pad clip may be placed between each end of the brake pads and the support bracket. When pad clips are used, one pad clip may be used at each end of the brake pads so that the brake pads are maintained in communication with a support bracket. A single pad clip may be used at adjacent ends of two opposing brake pads. The retraction spring assembly of the present teachings may provide for a pad clip located at one end of the brake pads or at each end of the brake pads. For example, a brake system may include two pad clips or four pad clips. A pad clip may be part of a retraction spring assembly. The retraction spring assembly may assist the brake pads in retracting after a brake apply and preventing tilting of the brake pads during a brake apply. The retraction spring assembly may assist in retracting one or more brake pads into contact with one or more pistons located within a respective piston bore. When the retraction spring assembly is placed within a fixed opposed caliper, the retraction spring may retract opposing brake pads into contact with opposing pistons. The retraction spring assembly may also be useful with a floating caliper. When the retraction spring assembly is placed within a floating caliper, the retraction spring may retract a brake pad of a floating caliper away from an opposing piston.

A piston typically resides within each opposing piston bore of a caliper. A brake fluid is generally in contact with each piston at a receiving end of the piston so that hydraulic pressure of the brake fluid is able to apply pressure (e.g., a brake apply force) on to the piston. The receiving end is opposite an apply end of the piston. An apply end of each piston is commonly located adjacent to a brake pad. When the hydraulic pressure applies the brake apply force on to a piston, the force on the piston results in the piston moving toward the rotor and the apply end pushing the brake pad against the rotor. The brake pad is then able to transfer the brake apply force to the rotor to result in braking of the vehicle. After a brake apply force from the hydraulic pressure is removed or reduced from the pistons, one or more retraction arms of a retraction spring apply a brake release force to the opposing brake pads.

The apply end of each piston may include an upper surface and a lower surface. The upper and lower surface of a piston may function to define a contact region of a brake pad. The upper surface may be the most radially outward point on a perimeter of the apply end. The lower surface may be the most radially inward point on a perimeter of the apply end. Radially inward and outward may be relative to a rotational axis of a rotor. Radially outward may be further from the rotational axis than radially inward. The apply end of each piston may define an upper boundary and lower boundary of a contact surface of a brake pad. The upper boundary may be any inward facing surface of the brake pad in line with the upper surface. The lower boundary may be any inward facing surface of the brake pad in line with the lower surface. In line may be defined as aligned along a line generally parallel with a rotational axis of the rotor. The upper boundary and lower boundary of a brake pad may define a contact surface of a brake pad. The contact surface may be a region of an inward facing surface of a brake pad which is in contact with a retraction spring. The contact surface may be in contact with a retraction arm of a retraction spring. The contact point or surface between a retraction arm and a contact surface may be referred to as a reaction point. The contact surface may allow for the reaction point to be located between the upper and lower boundaries. By applying a brake release force at the reaction point between the upper and lower boundaries, a pivoting motion of a brake pad may be prevented.

Each brake pad typically includes a pressure plate and friction material. The pressure plate functions as a portion of the brake pad which receives the force from the piston while the friction material functions as the portion of the brake pad which makes contact with a rotor to create a brake apply force. A pressure plate may include one or more features for mating with one or more portions of a retraction spring assembly. The one or more features may include one or more protrusions, extensions, notches, indents, channels, and/or the like which are adapted to engage with one or more pad clips. For example, the one or more pressure plates may include one or more ears. One or more ears may be one or more protrusions which extend from the pressure plate and are received within a channel of one or more pad clips. One or more ears may extend from a pressure plate in a directly of a pad clip, radially outward, or both. One or more ears may have a width smaller than, equal to, or larger than a width of a channel of a pad clip (e.g., width of channel before pad clip is installed within a brake system). The one or more features may include one or more notches, indents, bores, grooves, and the like which are adapted to be in contact with one or more retraction arms of a retraction spring. For example, a pressure plate may include a bore within the contact surface which receives a free end of a retraction arm of a retraction spring.

The retraction spring assembly includes one or more retraction springs. The one or more retraction springs may function to receive energy from one or more brake pads during a brake apply; release energy during a brake release; transfer energy to the one or more brake pads during a brake release; retract one or more brake pads during a brake release; or a combination thereof. One or more retraction springs may be in direct or indirect contact with one or more brake pads. For example, a single retraction spring may be in direct contact with two opposing brake pads. A retraction spring may be made of a unitary piece or a plurality of pieces. A retraction spring may be comprised of one or more arms, segments, elbows, or a combination thereof. A retraction spring may include one or more body portions, retraction arms, or both. A retraction spring may be substantially symmetrical or asymmetrical. One or more retraction springs may be assembled with one or more pad clips. A pad clip and a retraction spring may form a retraction spring assembly. A retraction spring may have one or more portions residing within and/or extending through one or more channels and/or openings of a pad clip. A retraction spring may have one or more surfaces in contact with one or more brake pads. A retraction spring may function as a bias device.

One or more retraction springs may be a bias device. A bias device may be any device which is able to provide a sufficient amount of force so that a brake pad is retracted when a brake apply is complete. The bias device may be any device that is elastically deformable and may assist in retracting a brake pad after a brake apply and/or during a brake release. The bias device may orient the brake pads against the caliper, one or more pistons, or both so that the brake pads may be parallel to the rotor during running and/or during a brake apply. The bias device may pre-load the brake pads so that rattle is substantially reduced and/or eliminated during running. The bias device may include one or more retraction arms, contact surfaces, segments, elbows, helical loops, body portions, clip engagement portions, or any combination thereof. Energy may be stored in a bias device due to tension or increased tension between one or more arms, segments, elbows, helical loops, or any combination thereof. Energy may be released from the bias device by releasing at least some tension between one or more arms, segments, elbows, helical loops, or any combination thereof. The bias device may be located adjacent to one or more walls (e.g., upper wall, lower wall, inner wall, outer wall, etc.) and/or flanges of the pad clip, at least partially within one or more channels (e.g., body channel, ear channel), be free of contact and/or in contact with one or more walls, or any combination thereof.

When a retraction spring assembly is assembled with a brake system, the retraction spring may or may not extend further radially outward than one or more walls, channels, flanges, and/or stops of the pad clip and/or any portion of a brake pad, support bracket, caliper, or any combination thereof. One or more portions of a retraction spring may be located further radially outward relative to one or more walls (i.e., upper wall) of the pad clip. For example, a clip engagement portion may be located adjacent to and radially outward relative to an upper wall of a pad clip. A profile of the caliper may be located further radially outward than any portion, including the retraction spring, of the retraction spring assembly. As each retraction spring may be radially inward relative to the profile of the caliper, the retraction spring assembly may avoid interference with other portions of the brake system and/or vehicle components surrounding the brake system (e.g. wheels) and/or be protected from debris in this area (e.g. stones). A retraction spring may be located so that all or a portion may extend directly or indirectly over a rotor. For example, a body portion may extend over a rotor gap. One or more retraction springs may be located at one or more ends of one or more brake pads.

A retraction spring may be in or free of contact with a central portion of a pressure plate. A central portion of a brake pad may be any portion of a brake pad which contacts the rotor to transfer the brake apply force, any surface of a pressure plate having friction material thereon, or both. A retraction spring may be in direct contact with a contact region of a brake pad, pressure plate, or both.

A retraction spring may define one or more axes, planes, or both. The one or more axes and/or planes may function to structurally relate one or more portions of the retraction spring assembly relative to one or more other portions. One or more axes, one or more planes, or both may be generally parallel with, perpendicular to, or any angle therebetween relative to one or more other planes, axes, or both. One or more axes may include a longitudinal axis.

The longitudinal axis may extend along a height of the retraction spring (e.g., in a direction from top to bottom); extend from a body portion to one or more retraction arms; be located centrally within a body portion; be located centrally between one or more retraction arms and one or more body segments; may be parallel and/or perpendicular to one or more retraction arms, lock arms, connection segments, body segments, and/or legs of a clip engagement portion; or any combination thereof. The longitudinal axis may lie within (e.g., be parallel to) one or more planes, intersect (e.g., offset from parallel, perpendicular) one or more planes, or both. One or more planes may include a longitudinal plane, transverse plane, lateral plane, or any combination thereof.

A longitudinal plane may divide the retraction spring into longitudinal halves. One longitudinal half of the retraction spring may be closer to one or more of the opposing brake pads than another longitudinal half. The longitudinal plane may divide the retraction spring into substantially asymmetrical or symmetrical halves. A longitudinal plane may have the longitudinal axis lying therein. A longitudinal plane may pass from a body portion and between retraction arms; be free of having one or more connection segments, lock arms, and/or retraction arms passing therethrough; pass through a center of a body segment, a clip engagement portion, or both; be located between segments (e.g., connection segment), elbows, lock arms, retraction arms; or any combination thereof. A transverse plane may intersect the longitudinal plane, have the longitudinal axis lying therein, or both. A transverse plane may divide the retraction spring into transverse halves. One transverse half may be closer to the rotor, brake pads, pistons, or combination thereof as the opposing transverse half. A transverse plane may be parallel, perpendicular, or any angle therebetween relative to the longitudinal plane. A transverse plane may pass through one or more segments, elbows, lock arms, and/or retraction arms. A lateral plane may intersect the longitudinal plane, transverse plane, or both. A lateral plane may be transverse to a longitudinal axis. A lateral plane may be at parallel, perpendicular, or any angle therebetween relative to the longitudinal axis, longitudinal plane, transverse plane, or any combination thereof. A lateral plane may divide the retraction spring into lateral halves. One lateral half may be further radially outward (e.g., upper half) than another lateral half (e.g., lower half). One lateral half may be a body portion, another lateral half may be a retraction portion. One or more portions of a body portion may be located on a same or opposite side of the lateral plane as one or more retraction arms. For example, an entire body portion may be located on an opposite side of the lateral plane as opposing retraction arms.

A retraction spring may be able to be configured and move between a plurality of configurations. The configurations may be a mechanical reconfiguration of the retraction spring to allow assembly of the retraction spring or retraction spring assembly to be installed into a brake system, allow installation of one or more components (e.g., brake pads) into a brake system, engage one or more components of a brake system to apply or release a brake forcing, or any combination thereof. The retraction spring may be transitioned between one or more configurations into one or more other configurations. The retraction spring may be held in one or more configurations by one or more assembly aids, one or more components of a brake system, a pad clip, or any combination thereof. The plurality of configurations may include one or more assembly positions, engaged positions, release positions, apply positions, a position therebetween, or any combination thereof.

The assembly position may function to allow for a retraction spring assembly to be installed into a brake system before one or more other components of a brake system. An assembly position may allow for a retraction spring assembly to be free of interfering during assembly of one or more brake pads into a brake system. The assembly position may be any configuration where the retraction spring is biased away from one or more pistons, brake pads, or both. The assembly position may allow for brake pads to be assembled into a brake system after one or more retraction springs are installed into the brake system. The assembly position may allow for access to one or more components of a brake system for maintenance or repair. A retraction spring may be held in an assembly position by one or more assembly locks, one or more assembly aids, or both. One or more assembly locks may be part of a pad clip. One or more assembly aids may include one or more zip ties, cable ties, wires, hook and loop tie straps, clamps, wires, threads, tape, the like, or any combination thereof. One or more assembly aids may bias one or more arms, segments, and/or elbows of a retraction spring toward one another into the assembly position. One or more assembly aids, assembly locks, or both may hold one or more retraction arms biased toward one another. Removal of one or more assembly aids may allow the retraction spring to transition into one or more engaged positions. Biasing one or more retraction arms, lock arms, elbows, or a combination thereof closer together while in an assembly position may release the retraction arms from one or more assembly locks. Placement of one or more assembly aids onto one or more retraction arms, placement of one or more retraction arms within one or more assembly locks, or both may allow for a retraction spring to be transitioned into an assembly position from an engaged position. An assembly position may allow access to one or more brake pads, pistons, or other components of the brake system for repair or maintenance. The one or more retraction arms when released from the assembly position may bias to one or more engaged positions.

The one or more engaged positions may function to allow the retraction spring to receive a brake apply force, transfer a brake release force, store energy in and/or release energy from one or more energy storage portions, or any combination thereof. One or more engaged positions may allow for a retraction spring assembly to be in contact and/or free of interference with one or more brake components. One or more engaged positions may allow for a retraction spring to be free of contact with a rotor. The one or more engaged positions may be any configuration where the retraction spring is biased toward and/or away from one or more brake pads, a rotor, or a combination thereof. The one or more engaged positions may include a brake release position, brake apply position, the transition between a brake release position and brake apply position, or any combination thereof. A brake release position may function to allow the retraction spring to transfer a brake release force, release energy from one or more energy storage portions, retract one or more brake pads away from a rotor, or any combination thereof. To transition to a brake release position from a brake apply position and/or assembly position, one or more arms, segments, elbows, or combination thereof may move further away from one or more other arms, segments, and/or elbows. In a brake release position, an arm distance between retraction arms may be greater than in a brake apply position, assembly position, or both. A brake apply position may function to allow the retraction spring to receive a brake apply force, store energy in one or more energy storage portions, allow movement of one or more brake pads toward a rotor, or any combination thereof. To transition to a brake apply position from an assembly position, one or more arms, segments, elbows, or combination thereof may move further away from one or more other arms, segments, and/or elbows. In a brake apply position, an arm distance between retraction arms may be greater than in an assembly position. To transition to a brake apply position from a brake release position, one or more arms, segments, elbows, or combination thereof may move toward one or more other arms, segments, and/or elbows. In a brake apply position, an arm distance between retraction arms may be smaller than in a brake release position. A body portion may remain substantially static or be dynamic while the retraction spring transitions between one or more engaged positions to one or more other engaged positions.

A retraction spring may include one or more body portions. A body portion may function to engage a retraction spring with a pad clip, extend a retraction spring over a rotor gap, prevent movement of one or more portions of a retraction spring relative to a pad clip while allowing movement of one or more other portions, allow movement of one or more retraction arms, or a combination thereof. The body portion may be any size or shape to engage a retraction spring with a pad clip while allowing for movement of the one or more retraction arms. The body portion may be integral with or connected to one or more retraction arms. The body portion may be located radially further from a rotor than one or more retraction arms. The body portion may radially outward from a rotor, may extend over a rotor, may be free of extending over a rotor, may indirectly extend over a rotor, or any combination thereof. The body portion may be distanced from the rotor to prevent interference with the rotor. The body portion may be distanced from the rotor by a pad clip, a support bracket, a caliper, or a combination thereof. For example, one or more retraction springs may be located at one or more ends of one or more brake pads and a body portion of each retraction spring may extend away from and around an outer circumference of a rotor so that a retraction spring is able to contact opposing brake pads simultaneously without directly extending over a rotor. A body portion may have multiple points, portions, segments, elbows, or any combination thereof located equally far from the rotor. The body portion may have one portion located furthest from a rotor. The clip engagement portion may be the portion of a body portion furthest from the rotor. A body portion may include one or more portions in different or same planes than one or more other portions. A body portion may have a longitudinal plane, transverse plane, lateral plane, or any combination thereof passing therethrough. A body portion may reside partially or entirely on an opposite side of a plane (e.g., lateral plane) as one or more retraction arms. A body portion may be asymmetrical or symmetrical about one or more planes. A body portion may be symmetrical about a longitudinal plane. A body portion may have a longitudinal axis passing therethrough. A longitudinal axis may be located substantially centrally in the body portion. The body portion may be straight, arcuate, or a combination of both. A body portion may have one or more segments, arms, elbows, or a combination thereof to allow the body portion to engage with a pad clip. The body portion may include one or more clip engagement portions, body segments, connection segments, lock arms, or combination thereof. A body plane may be formed by one or more body segments, connection segments, elbows between the body segments and connection segments, or any combination thereof which are generally planar with one another. A body plane may be parallel to a lateral plane. A body plane may be perpendicular to a transverse plane, longitudinal plane, longitudinal axis, clip engagement plane, lock arm plane, retraction arm plane, or any combination thereof. The one or more segments and elbows of the body plane may substantially resemble a V, C, or U-shape. The one or more clip engagement portions, body segments, connection segments, and/or lock arms may be integrally connected by one or more elbows of the body portion.

The body portion may include one or more energy storage portions which allow the retraction spring to deflect and/or be biased into one or more assembly positions, engagement positions, or any combination thereof. An energy storage portion may function to store and/or release energy; assist in moving one or more legs of a clip engagement portion, connection segments, lock arms, retraction arms, and/or brake pads; or any combination thereof. One or more energy storage portions may store energy during assembly and/or a brake apply, release energy during a brake release, or both. One or more energy storage portions may be located anywhere along the body portion, retraction arms, between a body portion and one or more retraction arms, or any combination thereof which allow the retraction spring to deflect into one or more assembly positions, engagement positions, or any combination thereof. An energy storage portion may be any configuration so that as the retraction spring is compressed and bent, the compression and bending may be used to allow one or more brake pads to move toward a rotor; allow for assembly of a retraction spring with a pad clip; allow for assembly of a retraction spring and/or retraction spring assembly with a brake system; or any combination thereof. An energy storage portion may include one or more segments, elbows, helical loops, the like, or any combination thereof. An energy storage portion may be arcuate. An energy storage portion may be an additional piece of the retraction spring. An energy storage portion may be made of any material which assists retaining and releasing energy. An energy storage portion may have any shape suitable for retaining and releasing energy. An energy storage portion may be a V, S, C, and/or O shaped. The energy storage portion may be shaped as one or more arcuate portions, loops, triangles, circles, squares, or any combination thereof. An energy storage portion may be an elastomeric piece which is compressible. An energy storage portion may include a single or a plurality of arcs. One or more energy storage portions may be located between or along a length of one or more segments and/or arms of a body portion. Energy may be stored in an energy storage portion due to tension or increased tension between one or more arms, segments, elbows, helical loops, or a combination thereof. Energy may be released from an energy storage portion by releasing at least part of a tension between one or more arms, segments, elbows, helical loops, or a combination thereof. One or more energy storage portions may be formed by two or more segments connected by one or more elbows. One or more energy storage portions may be part of, located between, and/or connect one or more clip engagement portions, body segments, connection segments, lock arms, or any combination thereof. One or more energy storage portions may connect a body portion to one or more retraction arms. One or more energy storage portions may connect one or more connection segments and/or lock arms to one or more retraction arms. One or more energy storage portions may be part of a clip engagement portion.

A body portion may include one or more clip engagement portions. The one or more clip engagement portions may function to engage a retraction spring with a pad clip, limit axial (e.g., linear) movement of a body portion relative to a pad clip, limit rotational movement of a body portion relative to a pad clip, or any combination thereof. A clip engagement portion may have any size or shape suitable for affixing a retraction spring with a pad clip, being inserted through an opening (e.g., spring window) of a pad clip, or both. When assembled with a pad clip, the clip engagement portion may or may not be in direct contact and/or adjacent to one or more tabs of the pad clip. The clip engagement portion may be adjacent to and in direct contact with an anti-rotation tab. For example, when assembled with the pad clip, the clip engagement portion may be located adjacent to one or more walls of the pad clip. For example, the clip engagement portion may be located adjacent to an upper wall outside of a pad channel. A clip engagement portion may substantially resemble a C, U, or V shape. A clip engagement portion may include one or more segments, elbows, energy storage portions, or a combination thereof. One or more segments (e.g., legs), one or more elbows, or both of a clip engagement portion may be relatively coplanar and form a clip engagement plane. A clip engagement plane may be parallel, perpendicular, or any angle therebetween relative to one or more other planes of the retraction spring. A clip engagement plane may be parallel with a lock arm plane, a retraction arm plane, a transverse plane, longitudinal axis, or any combination thereof. A clip engagement plane may be perpendicular with a lateral plane, body plane, or both. One or more body segments of the body portion may be integrally connected to a clip engagement portion. A clip engagement portion may include two or more opposing segments connected via one or more elbows. The segments may be referred to as legs. For example, the clip engagement portion may include two legs integrally connected via an elbow. The two or more legs may angle away from each other, angle toward one or more body segments, or both. A distance between the two or more legs may decrease as the legs are angled toward one another.

A distance between the two or more legs may be referred to as a leg distance. The distance between the two or more or more legs may be measured at an end of the legs opposite the one or more elbows in between the two or more legs. The leg distance may increase or decrease upon application of a force, such as a compression force. A force (e.g., compression force) applied to one or both legs may result in the one or more elbows storing energy, one or more legs bending about the one or more elbows, distance between one or more legs becoming smaller, or any combination thereof. The leg distance may decrease upon application of a compression force. A compression force, decreased leg distance, or both may allow the clip engagement portion to be inserted through a spring window. The leg distance may be smaller than a width of a spring window upon application of a compression force. The leg distance may increase upon releasing a compression force. The one or more legs being free of a force (e.g., compression force) may allow the one or more elbows to deflect, release stored energy, one or more legs to move away from one or more other legs, or any combination thereof. An increased leg distance may allow the clip engagement portion to be affixed to the pad clip. The leg distance may be greater than a width of a spring window when free of a compression force. A clip engagement portion may be received through an opening of a pad clip. A clip engagement portion may pass through a spring window of a pad clip engage the retraction spring with the pad clip.

Two or more legs of the clip engagement portion may form an angle therebetween. The angle between the two or more legs may be referred to as an engagement angle. The angle between the two legs may fluctuate as the leg distance changes. The angle may decrease when the leg distance decreases and/or increase when the leg distance increases. The engagement angle may be any suitable angle for allowing the clip engagement window to pass through the spring window, be engaged with the pad clip, or both. The engagement angle in one or more engaged positions or in a non-compressed state may be about 30° or greater, about 40° or greater, about 50° or greater, or even about 60° or greater. The engagement angle in one or more engaged positions or in a non-compressed state may be about 110° or less, about 100° or less, about 90° or less, or even about 80° or less. Upon application of a compression force to one or more legs, the engagement angle may be reduced by about 5° or greater, about 10° or greater, about 20° or greater, or even about 30° or greater. Upon application of a compression force to one or more legs, the engagement angle may be reduced by about 70° or less, about 60° or less, about 50° or less, or even about 40° or less.

The retraction spring may include one or more lock arms. One or more lock arms may function to allow the retraction spring to be configured into one or more configurations (e.g., assembly position, one or more engaged positions). One or more lock arms may deflect away from and/or be biased toward one or more stops of a pad clip. One or more lock arms may deflect away from one or more stops to allow the retraction spring to be configured into an assembly position. One or more lock arms may be biased toward one or more stops to allow the retraction spring to be configured and/or sustained in one or more engaged positions. One or more lock arms may include one or more segments and/or elbows of the retraction spring. One or more lock arms may be between one or more connection segments and one or more retraction arms. One or more lock arms may be separate from or integrally connected to one or more connection segments and one or more retraction arms. Two or more lock arms may be substantially coplanar and form a lock arm plane. The lock arm plane may be substantially parallel, perpendicular, or any angle therebetween relative to one or more other planes of the retraction spring. The lock arm plane may be parallel with a clip engagement plane, a transverse plane, a retraction arm plane, or a combination thereof. The lock arm plane may be perpendicular with a lateral plane, a body segment plane, or both. The lock arms may act as a spring, a cantilever connection, or both. A lock arm may have a shape suitable for engaging with a stop of a pad clip. One or more segments and/or elbows of a lock arm may form a contour which is adapted to match with the shape of a stop, substantially inverse to a contour of a stop, at least partially surround a stop, or any combination thereof. A lock arm may have a general C-shape, U-shape, J-shape, S-shape, M-shape, N-shape, or any combination thereof. For example, the lock arm may have a general C-shape which opens away from a longitudinal plane. A contour of the lock arm adapted to match with a stop may be referred to as a lock bend segment. The lock arm may be connected to one or more energy storage portions. One or more energy storage portions may bias one or more lock arms toward one or more stops of a pad clip, away from one or more other lock arms, or both. One or more lock arms may reside within one or more channels of a pad clip. One or more lock arms may reside within a lock segment channel. One or more lock arms may reside at least partially between opposing walls of a pad clip. One or more lock arms may reside between and adjacent to an inner wall and an outer wall of a pad clip. One or more lock arms may cooperate with one or more other lock arms.

One or more lock arms may include two or more lock arms. Two or more lock arms may be located on opposing sides of a body portion. Two or more lock arms may be integrally connected to opposing connection segments, opposing retraction arms, or both. Two or more lock arms may be asymmetrical or symmetrical. Two or more lock arms may be symmetrical about a plane, such as the longitudinal plane. Two or more lock arms may be distanced from one another. The distance between two or more lock arms may be a linear distance. The linear distance may be parallel to a body plane, lateral plane, or both. The linear distance may be generally perpendicular to a longitudinal axis. The linear distance between two or more lock arms may be referred to as a lock distance. The lock distance may remain fixed or change. The lock distance may be greater or smaller in an assembly position as compared to one or more engaged positions. The lock distance may remain fixed in one or more engaged positions. Movement of one or more lock arms to one or more engaged positions from an assembly position may result in one or more lock arms moving away from a longitudinal axis, longitudinal plane, another lock arm, a bridge of a pad clip; moving toward and/or into contact with a stop of a pad clip; or any combination thereof. Biasing of one or lock arms into an assembly position may result in one or more lock arms moving toward a longitudinal axis, longitudinal plane, another lock arm, a bridge of a pad clip; moving away from and/or out of contact with a stop of a pad clip; or any combination thereof. Movement of one or more lock arms from an assembly position to one or more engaged positions may be planar or non-planar along a lock arm plane, parallel to a transverse plane, perpendicular to a lateral plane, or a combination thereof.

The one or more lock arms may produce any force so that the retraction spring is retained within a brake system, in contact with the pad clip and/or a channel of the pad clip, fixed to the pad clip and/or channel of the pad clip or any combination during running, a brake apply, a brake release, or any combination thereof. The one or more lock arms may create a gripping force, a spread force, or a combination of both. The force may be two opposing forces (i.e., a holding force, an opposing holding force) that connect the retraction spring to a brake component, the pad clip, and/or a channel of the pad clip. The holding force, the opposing holding force, or both may be greater than 0 N, about 0.1 N or greater, about 1 N or greater, about 5 N or greater, about 10 N or greater, or even about 15 N or greater. The holding force, the opposing holding force, or both may be about 50 N or less, about 40 N or less, about 30 N or less, or even about 20 N or less. The holding force may be applied to a part of the pad clip and the opposing holding force may be applied to a generally opposing part of the pad clip and/or opposing the holding force. The holding force, the opposing holding force, or both may be created on any part of the pad clip, the support bracket, the abutment, any combination thereof so that the retraction spring is retained within the brake system. The holding force, the opposing holding force, or both may be created on one or more bias locks, engagement aids, or both of a pad clip. The holding force, the opposing holding force, or both may be created on opposing stops of a bias lock of a pad clip. The holding force, the opposing holding force, or both may be created on opposing stops located within a bias lock channel of a pad clip, projecting from an outer wall, or both.

A retraction spring includes one or more retraction arms. The one or more retraction arms may function to assist in forming a connection with one or more brake pads, retracting one or more brake pads, contacting one or more brake pads, preventing tilting of one or more brake pads, transferring energy to and/or from an energy storage portion, or any combination thereof. One or more retraction arms may include a single retraction arm or a plurality of retraction arms. A plurality of retraction arms may include a first retraction arm and a second retraction arm. A retraction arm may be any size and shape so that a retraction arm extends between a brake pad and one or more energy storage portions so that during a brake apply energy from movement of the brake pad may be transferred to the one or more energy storage portions and during a brake release the energy may be transferred back to the brake pad so that the brake pad is retracted. A retraction arm may have any shape that allows the retraction arm to contact a brake pad without contact any other moving components of a brake system, including a rotor. The one or more retraction arms may be straight, arcuate, or both. One or more retraction arms may have a length. The length may be any suitable length so that the retraction arm may be in direct contact with a pressure plate when a retraction spring is in an engaged position, is able to assist in retracting one or more brake pads, or both. One or more retraction arms may extend so that a portion of a retraction arm extends over a brake pad, under a brake pad, over an ear of a brake pad, under an ear of a brake pad, between a brake pad and a rotor, into contact with a bore in the pressure plate of the brake pad, to the side of the pressure plate proximate to the friction material, or any combination thereof. The retraction arm may extend so that a portion of the retraction arm is in direct contact with an inner surface of a brake pad opposite an outer surface, within a contact region of a brake pad, or both. One or more retraction arms may include one or more segments, one or more elbows, or both. One or more retraction arms may be integrally affixed to one or more segments, elbows, energy storage portions, body portions, clip engagement portions, or any combination thereof. A plurality of retraction arms may be located on opposing sides of a body portion. For example, a first retraction arm may be located on an opposing side of a body portion as a second retraction arm. Two or more retraction arms may define one or more planes. A longitudinal plane may be located midway between two retraction arms (e.g., first and second retraction arms). The two retraction arms may be biased toward or away from the longitudinal plane in one or more positions of the retraction spring. One or more lock arms, elbows, energy storage portions, or a combination thereof may be biased into an assembly position, resulting in the two retraction arms being biased toward the longitudinal plane as compared to in an engaged position. One or more lock arms, elbows, energy storage portions, or a combination thereof may be deflected into one or more engagement positions, resulting in the two retraction arms deflecting away from the longitudinal plane as compared to an assembly position. One or more retraction arms may be located parallel, perpendicular, or any angle therebetween relative to one or more segments, elbows, energy storage portions, body portions, clip engagement portions, or any combination thereof.

The one or more retraction arms may extend away from a longitudinal plane, one or more segments, or both at an angle relative to the longitudinal plane and/or segment when viewed in a plan or elevation view, such as a front elevation view. A front elevation view may be parallel to a transverse plane, may face the length of both retraction arms, may provide a symmetrical view of the retraction spring, or any combination thereof. An angle of one or more retraction arms relative to a longitudinal plane may be a longitudinal retraction angle. The longitudinal retraction angle in one or more configurations may be about 0° or greater, about 10° or greater, about 20° or greater, or even about 25° or greater. The longitudinal retraction angle in one or more configurations may be about 60° or less, about 50° or less, about 40° or less, or even about 35° or less. In transitioning from one to another engagement position, a longitudinal retraction angle may increase or decrease. In moving from a brake release position to a brake apply position, longitudinal retraction angle may decrease. In moving from a brake release position to a brake apply position, the longitudinal retraction angle may decrease by about 5° or greater, about 10° or greater, or even by about 15° or greater. In moving from a brake release position to a brake apply position, the longitudinal retraction angle may decrease by about 60° or less, about 50° or less, about 40° or less, about 30° or less, or even by about 25° or less. The one or more retraction arms may extend away from one or more segments (e.g., body segment), planes (e.g., transverse plane), or both at an angle. An angle formed between one or more retraction arms and a transverse plane, body segment, or both may be referred to as a transverse retraction angle. The transverse retraction angle in one or more configurations may be about 30° or greater, about 40° or greater, about 50° or greater, or even about 55° or greater. The transverse retraction angle in one or more configurations may be about 90° or less, about 80° or less, 70° or less, or even about 65° or less. When in an engaged position, the transverse retraction angle may increase or decrease. In moving from a brake release position to a brake apply position, the angle of one or more retraction arms relative to a segment may increase. In moving from a brake apply position to a brake release position, transverse retraction angle may increase by about 5° or greater, about 10° or greater, or even by about 15° or greater. In moving from a brake apply position to a brake release position, the transverse retraction angle may increase by about 60° or less, about 50° or less, about 40° or less, about 30° or less, or even by about 25° or less. One or more retraction arms may be coplanar with one or more other arms in one or more configurations. In one or more engaged positions, a first retraction arm may be coplanar with the second retraction arm. One or more retraction arms may form one or more arm planes when the retraction arms are coplanar. The one or more arm planes may be generally parallel, perpendicular, or any angle therebetween relative to one or more other planes. The one or more arm planes may be substantially perpendicular with the longitudinal plane, lateral plane, or both. The one or more arm planes may be substantially parallel with a transverse plane.

One or more retraction arms may include one or more contact surfaces. The one or more contact surfaces may function to form a connection with a brake pad, and/or pressure plate, or both; transfer energy from the retraction arm to the brake pad and vice-versa; or a combination thereof. The contact surface may have any size or shape suitable for forming a connection with the brake pad to transfer energy from the retraction arm to the brake pad and vice-versa. The contact surface may be any portion or surface of the retraction arm adapted to contact a brake pad. The contact surface may be a segment, elbow, or free end of the retraction arm. A contact surface may be at a free end of a retraction arm opposite one or more lock arms. The contact surface may have a surface adapted to match a surface of a portion of a brake pad. A portion of the brake pad may be the pressure plate. The contact surface may be generally planar, non-planar, or both. The contact surface may face away from a longitudinal plane, toward a pressure plate, or both. The point or surface of contact formed between the contact surface and a brake pad may be referred to as a reaction point. The contact surface may form a fixed connection with an ear of a brake pad. The contact surface may grip and/or be in direct contact with a portion of a brake pad, a pressure plate, wrap around a brake pad, extend to a friction side of a pressure plate, or any combination thereof.

The retraction spring may deform as the brake pads wear. The deformation may be elastic deformation. For example, the shape of the retraction spring may not permanently change as the brake pads wear, but the retraction spring may elastically deform so that the retraction spring remains in contact with the brake pad as the friction material wears, and assists in returning the brake pad substantially back to their pre-brake position so that a constant air gap is maintained. Air gap may be a total distance between a face of an inner brake pad and a face of an outer brake pad minus the thickness of a rotor when the inner brake pad contacts the caliper piston and the outer brake pad contacts the caliper fingers. The air gap may be a distance between the outer surface of a rotor and the face of the outer brake pad when the inner brake pad is pushed into contact with the inner surface of the rotor and when the inner brake pad contacts the piston and the outer brake pad contacts the fingers. The air gap may be any size that allows for braking. The air gap may be any size that does not cause the brake pedal to have a soft feel or a long travel. The air gap will be small (e.g., between about 0.05 mm to about 0.5 mm). The deformation may be plastic deformation. As the brake pads wear, the retraction spring may change shape so that as the friction material wears the retraction of the brake pad is less but the air gap is maintained at substantially the same distance. As the retraction spring plastically deforms, the force exerted against each brake pad will remain substantially constant.

The retraction spring may exert a force axially, in relationship to the rotor, and/or in the brake release direction. The retraction spring may apply any amount of force which assists the one or more brake pads in moving axially, relative to the rotor, after a brake apply. If a plurality of retraction spring assemblies are installed in a brake system, each of the retraction springs may exert substantially the same force on each of the respective brake pads. The one or more retraction springs may each exert an axial force in the brake release direction of about 5 N or greater, about 10 N or greater, about 15 N or greater, about 20 N or greater, about 25 N or greater, or even about 30 N or greater. The one or more retraction springs may each exert an axial force in the brake release direction of about 50 N or less, about 45 N or less, about 40 N or less, or even about 35 N or less. Two retraction springs may be used (i.e., a retraction spring connected at each end of opposing brake pads). Each retraction spring may exert an axial force in the brake release direction. For example, one retraction spring may exert a force of about 20 N and two retraction springs may exert a force of about 40 N on each brake pad. Two retraction springs may exert a force of about 10 N or greater, about 20 N or greater, about 30 N or greater, about 40 N or greater, about 50 N or greater, or even about 60 N or greater. Two retraction springs may exert a force of about 100 N or less, about 90 N or less, about 80 N or less, or even about 70 N or less. The one or more retraction springs may apply substantially the same amount of force to both brake pads in the brake release direction.

The retraction spring may be made of any material that may be formed and may exert a force when compressed. The material of the retraction spring may be elastically deformable, plastically deformable, or a combination of both. For example, during a brake apply the material may elastically deform to move and then create a force to move back to an original position, and the material of the retraction spring may plastically deform as the brake pads wear so that a substantially constant air gap is maintained from a new condition to a worn condition of the brake pads. The retraction spring may be made of and/or include one or more polymeric materials, metals, or any combination thereof. The retraction spring may be made of any one or more metals which exhibit good plastic deformation and good elastic deformation characteristic. The one or more metals may comprise stainless steel. Preferably, the retraction spring is made of a spring steel. The retraction spring may be made of a wire, sheet, band, tube, pipe, or the like. The material may be any gauge which assists in moving the one or more brake pads in the retract or release direction. The material may be any size which allows the retraction spring to exert a desired force. The material may be any size (e.g., thickness, diameter, gauge, length, width, or the like) that allows the retraction spring to assist in pad retraction. The wire may be about 0 gauge or more, about 3 gauge or more, about 5 gauge or more, or even about 10 gauge or more. The wire may be about 30 gauge or less, about 25 gauge or less, or even about 20 gauge or less.

The retraction spring assembly of the disclosure includes a pad clip. The pad clip may function to connect at least a portion of a brake pad with a support bracket; retain a retraction spring; connect a retraction spring with at least a portion of a brake pad; connect the retraction spring assembly with at least a portion of a support bracket; caliper, and/or brake pad, or any combination thereof. The pad clip may be connected to at least a portion of a support bracket, brake pad, caliper, retraction spring, or any combination thereof. The pad clip may be connected to an abutment of a support bracket, a projection of a caliper, an ear of a pressure plate, a body portion of a retraction spring, one or more segments of a retraction spring, or any combination thereof. The pad clip may be sandwiched between a brake pad and a support bracket. The pad clip may include one or more walls, arcuate walls, channels, assembly locks, bias locks, engagement aids, flanges, tabs, stops, pockets, or any combination thereof. One or more walls may provide the general profile and/or shape of the pad clip. The one or more walls may form one or more channels. One or more flanges and/or stops may project from one or more walls. One or more stops may be part of one or more bias locks. One or more flanges may be part of one or more engagement aids. One or more walls, flanges, and/or stops may be generally parallel, perpendicular, or any angle therebetween relative to one or more other walls, flanges, and/or stops. Generally parallel and/or generally perpendicular may mean within ten degrees of parallel and/or perpendicular. The pad clip may elastically and/or plastically deform upon engagement with a support bracket, caliper, brake pad, or any combination thereof. The deformation may result in an increase and/or decrease in an angle between one or more walls, flanges, stops, or any combination thereof. The deformation may allow one or more channels to form a friction-fit with the support bracket, caliper, brake pad, or any combination thereof. One or more walls may be generally planar, non-planar, or both. Non-planar may mean curved, bowed, indented, having one or more openings, the like, or any combination thereof. The pad clip may be formed as a one-piece or multi-piece component. The pad clip may include one or more channels for engaging with a support bracket, brake pad, retraction spring, or any combination thereof. The pad clip may be substantially symmetrical or asymmetrical. When assembled as part of a retraction spring assembly, a pad clip may be symmetrical about a same plane as a retraction spring. The pad clip may be symmetrical about a bridge. The pad clip may include or be free of a bridge. A bridge may include or be free of one or more walls, arcuate walls, or both. A bridge may be centered along a length of a pad clip. A bridge may be a portion or all of a length of a pad clip. A length of a bridge may be measured generally perpendicular to a rotational axis of a rotor, a longitudinal axis of a retraction spring, or both. A bridge may be about 10% or greater, about 25% or greater, or even about 40% or greater of a length of a pad clip. A bridge may be about 90% or less, about 75% or less, or even about 60% or less of a length of a pad clip. A bridge may have a length less than or equal to a width of a rotor gap. A bridge may extend over a rotor gap when part of a brake system. A bridge may include one or more openings. The bridge may include a spring window.

The pad clip may include one or more channels. The one or more channels may function to receive, engage, and/or be affixed to a portion of a caliper, support bracket, brake pads, retraction spring, or any combination thereof. The one or more channels may be formed by one or more walls, projections from walls, or both. One or more channels may be adjacent to one or more other channels or distanced from one or more other channels. One or more channels may be parallel, perpendicular, or any angle therebetween relative to one or more other channels. For example, a lock channel may be substantially perpendicular to a caliper channel. One or more channels may face (i.e., be open toward) an opposing and/or the same direction as one or more other channels. One or more channels may include an abutment channel, caliper channel, lock channel, ear channel, or a combination thereof.

An abutment channel may function to receive an abutment of a support bracket. An abutment channel may be sized to fixedly engage an abutment. The abutment channel may be formed by one or more walls, a projection from a wall, or both. The abutment channel may be formed by a wall and a projection from a wall. For example, the abutment channel may be formed by an upper wall and a projection extending from the upper wall. The abutment channel may be formed in a cavity formed between a wall and the projection from a wall. The cavity between the wall and the projection may be sized about equal to or less than a size of an abutment, such as before having the abutment located therein. The wall and the projection may form an interference fit with an abutment. The projection from the wall may have a shape suitable for engaging with the abutment. The projection may have a shape reciprocal with at least part of the shape of the abutment. The projection may have a shape which is substantially curved, linear, or both. The projection may be substantially C-shaped. The projection may be referred to as a support tab. The projection may be located adjacent to one or more openings of the pad clip. The projection may be located adjacent to the spring window. The projection may project from an upper wall, be located on a bridge, be located on an opposing side of an opening as another projection, or any combination thereof. The projection may be located opposite another tab of the pad clip relative to an opening. The projection and the other tab may form a caliper channel.

A caliper channel may receive a portion of a support bracket and/or caliper, a retraction spring, or any combination thereof. The caliper channel may be sized and/or shaped to fixedly engage a portion of a support bracket, caliper, a retraction spring, or any combination thereof. A portion of the retraction spring may be a clip engagement portion. The caliper channel may retain a portion of a caliper and/or support bracket and a clip engagement portion therein. The caliper channel may be a cavity formed by one or more walls, one or more projections from a wall, or a combination thereof. The caliper channel may be formed by a wall and opposing projections from the wall. For example, the caliper channel may be formed by an upper wall and an anti-rotation tab opposing a support tab. The anti-rotation tab may project from the upper wall. The anti-rotation tab may project at a suitable angle from the upper wall so that the anti-rotation tab and support tab retain the support bracket, caliper, and/or retraction spring with an interference fit. The anti-rotation tab may project from the upper wall at an angle of about 60° or greater, about 70° or greater, or even 80° or greater. The anti-rotation tab may project from the upper wall at an angle of about 120° or less, about 110° or less, or even about 100° or less. The anti-rotation tab may project from the upper wall substantially perpendicularly. The caliper channel may include one or more openings in one or more walls and/or projections. The one or more openings may be located within and/or between one or more walls, projections, or both. For example, a spring window may be located in the upper wall between the opposing projections. Opposite the caliper channel and/or the abutment channel, there may be an ear channel.

An ear channel may receive a portion of a pressure plate, may maintain alignment of a pressure plate, allow a pressure plate to move therethrough, prevent rattle of a brake pad, or any combination thereof. The ear channel may be formed by any portion of the pad clip in proximity, in contact, and/or facing toward one or more pressure plates. The ear channel may receive an ear of a pressure plate therein. The ear channel may be formed by one or more walls, as a gap between two or more walls, or both. For example, the ear channel may be formed by a gap between a lower wall and an inner wall. The lower wall may be opposite the upper wall, connected to the upper wall, or both. The lower wall may be integrally connected to the upper wall via an arcuate wall. The arcuate wall may be located opposite the inner wall. The lower wall may be parallel or at an offset angle relative to the upper wall. The lower wall may extend from the arcuate wall at an angle toward the upper wall. The lower wall may be at an angle of about 0° (e.g., parallel) or greater, about 5° or greater, or even about 10° or greater relative to the upper wall. The lower wall may be at an angle of about 50° or less, about 30° or less, or even about 20° or less relative to the upper wall. The lower wall may include a fit feature to cooperate with an inside wall for engaging the pressure plate. The lower wall may include one or more arcuate walls formed therein. The lower wall may have an arcuate wall located at a free end opposite the arcuate wall affixed to the upper wall. The arcuate wall may deflect to engage the pressure plate between the lower wall and inner wall. The fit may allow for the pressure plate to move within the ear channel in one or more directions while preventing movement of the pressure plate in one or more other directions. The fit may allow for axial movement of the pressure plate in a brake apply and brake release directions. The fit may prevent movement of the pressure plate at an angle relative to the axial direction of the brake apply and brake release directions. By preventing movement of the pressure plate, the fit may be advantageous in preventing rattle of the brake pad. The inner wall may also form part of a lock channel.

A lock channel may include one or more bias locks, assembly locks, engagement aids, receive and/or engage one or more lock arms, or a combination thereof. The lock channel may be sized and/or shaped to receive one or more lock arms. The lock channel may be formed by an portion of a pad clip in communication with one or more lock arms, include one or more bias locks able to engage one or more lock arms, or both. The lock channel may be formed by one or more walls, a gap between two or more walls, or both. For example, the lock channel may be formed by a distance between an inner wall and an outer wall. An inner wall, outer wall, or both may be parallel, perpendicular, or any angle therebetween relative to an upper wall, lower wall, or both. An inner wall, outer wall, or both may be at an angle of about 70° or greater, about 80° or greater, or even about 85° or greater relative to a lower wall, upper wall, or both. An inner wall, outer wall, or both may be at an angle of about 110° or less, about 100° or less, or even about 95° or less relative to a lower wall, upper wall, or both. An inner wall may be substantially perpendicular relative to an upper wall. An inner wall may be adjacent to, connected to, and/or integral with an upper wall. The inner wall may be connected to an upper wall via one or more arcuate walls. The inner wall may be at angle relative to the outer wall. The inner wall may be parallel or at an offset angle relative to the outer wall. The inner wall may be about 0° or greater, about 5° or greater, or even about 10° or greater relative to an outer wall. The inner wall may be about 30° or less, about 20° or less, or even about 15° or less relative to an outer wall. The inner wall may be adjacent to the outer wall, opposite the outer wall, connected to the outer wall, and/or integral with the outer wall. The inner wall may be connected to the outer wall via one or more arcuate walls. The inner wall may be distanced from the outer wall at a distance equal to or greater than a thickness of one or more lock arms. The inner wall may have a width less than, equal to, or greater than a width of the outer wall. The inner wall may form part of a bridge of the pad clip. The inner wall may be opposite a portion of an outer wall having one or more stops and/or ramps projecting therefrom, pockets formed therein, or any combination thereof. The lock channel may include one or more stops. The one or more stops may be one or more stops of a bias lock. The one or more stops may project from an outer wall. The one or more stops may project toward the inner wall. The one or more stops may be located on opposing sides of a bridge of the pad clip. One or more stops may include two or more stops. Two or more stops may include one or more lock arms therebetween. The lock channel may include one or more pockets which form part of one or more assembly locks.

The pad clip may include one or more assembly locks. One or more assembly locks may function to retain the retraction spring in one or more configurations. One or more assembly locks may function to retain a retraction spring in an assembly position. One or more assembly locks may be part of one or more walls, channels, a bridge, or combination thereof the pad clip. One or more assembly locks may have any size, shape, and/or configuration suitable for retaining one or more portions of a retraction spring in an assembly position. One or more assembly locks may retain one or more portions of a retraction spring in an assembly position while free of an additional assembly aid or in conjunction with an assembly aid. One or more assembly locks may be formed as one or more pockets. The one or more pockets may be formed in one or more surfaces or edges of one or more walls of a pad clip. The one or more pockets may be part of the outer wall. The one or more pockets may be located at one or more edges of an outer wall. The one or more pockets may be located at one or more edges of an outer wall adjacent to and/or integral with an arcuate wall. The one or more pockets may be located along a length of an edge of a wall being free of an integral arcuate wall. The one or more pockets may be located at one or more edges of an outer wall adjacent to and/or integral with a bridge of the pad clip. For example, two pockets may be located an edge of an outer wall integral with an arcuate wall of a bridge while on opposite sides of the bridge of the pad clip. The bridge may include an arcuate wall integrally connected to both the inner wall and the outer wall. The one or more pockets may be an opening, cut-out, indentation, groove, notch, the like, or combination thereof. The one or more pockets may have any shape suitable for receiving at least a portion of one or more lock arms. The one or more pockets may or may not be shaped substantially reciprocal to a portion of a contour of one or more lock arms. The one or more pockets may have a cut-out shape which is substantially that of a portion (e.g., half) of a circle, square, rectangle, triangle, ellipse, oval, the like, or a combination thereof. For example, each pocket may be a cut-out shape at an edge of a pad clip wall having a half-circle shape resembling a half-moon. The one or more pockets may be located adjacent to one or more engagement aids.

The pad clip may include one or more engagement aids. The one or more engagement aids may function to aid a retraction spring in moving from an assembly position to one or more engaged positions. The one or more engagement aids may be part of one or more walls, channels, a bridge, or a combination thereof of the pad clip. The one or more engagement aids may have any size, shape, and/or configuration for aiding one or more portions of a retraction spring into one or more engagement positions from an assembly position. The one or more engagement aids may include one or more surfaces of a pad clip. The one or more surfaces may guide one or more portions of a retraction spring from an assembly lock toward a bias lock. The one or more surfaces may guide one or more portions of a retraction spring from one or more pockets toward one or more stops of a pad clip. The one or more surfaces may guide one or more lock arms, elbows, retraction arms, or combination thereof of a retraction spring. The one or more engagement aids may include one or more flanges. The one or more flanges may be located adjacent to and/or in proximity to the one or more pockets. The one or more flanges may extend from one or more walls of the pad clip. One or more flanges may project from a wall having as assembly lock (e.g., one or more pocket) formed therein. One or more flanges may project from an outer wall of the pad clip. One or more flanges may project from a wall substantially parallel, perpendicular, or any angle therebetween relative to one or more walls of the pad clip. One or more flanges may project at an angle of about 60° or greater, about 70° or greater, or even about 80° or greater relative to an outer wall. One or more flanges may project at an angle of about 120° or less, about 110° or less, or even about 100° or less relative to the outer wall. The one or more flanges may include two or more flanges. For example, the two or more flanges may include a first flange and a second flange. Two or more flanges may be located on opposing sides of a bridge of the pad clip. A pocket may be located between a flange and a bridge. The one or more flanges may have a shape suitable for guiding one or more portions of a retraction spring from an assembly lock toward a bias lock. The shape may refer to a two-dimensional shape, three-dimensional shape, or both. A two-dimensional shape of the one or more flanges may be substantially triangular, square, rectangular, circular, oval, the like, or a combination thereof. For example, a flange may have a substantially triangular shape. A triangular shape may provide for a ramp surface.

One or more flanges may include a ramp surface. The ramp surface may allow for one or more portions of a retraction spring to travel along the ramp surface from an assembly lock to a bias lock, from an assembly position to one or more engaged positions, or both. The ramp surface may be opposite where a flange is integrally connected to a wall. A ramp surface may be an exposed edge of a flange. The ramp surface may be generally parallel, perpendicular, or an angle therebetween relative a surface of a pad clip wall. The ramp surface may be angled relative to a substantially planar surface of an outer wall facing inward, toward the lock channel. The ramp surface may be sloped away or toward an assembly lock, bias lock, or both. The ramp surface may slope away from one or more pockets of the pad clip. The ramp surface may slope away from an assembly lock at an angle of about 5° or greater, about 7° or greater, or even about 10° or greater relative to a surface of a wall from which the flange projects. The ramp surface may surface may slope away from an assembly lock at an angle of about 30° or less, about 25° or less, or even about 20° or less relative to a surface of a wall from which the flange projects. The slope of the ramp surface may provide for a pivot surface.

One or more flanges may include a pivot surface. The pivot surface may provide for a pivot point for one or more portions of a retraction spring to pivot about from one or more engagement positions to one or more other engagement positions. The pivot surface may be any surface of a pad clip which allows for one or more portions of a retraction spring to move from one or more engagement positions to one or more other engagement positions. The pivot surface may be a surface of one or more flanges located opposite an assembly lock. The pivot surface may be a surface of a flange opposite one or more pockets. A ramp surface may be located between the pivot surface and an assembly lock. The pivot surface may be an exposed edge or surface of a flange, adjacent to a ramp surface, or both. In one or more engaged positions, one or more lock arms, elbows, retraction arms, or combination thereof may pivot about the pivot surface. A brake force (e.g., brake apply, brake release) applied to one or more retraction arms may result in the one or more lock arms, elbows, retraction arms, or a combination thereof pivoting about the pivot surface. The pivot surface may cooperate with a bias lock to retain a body portion within a pad clip, such as in one or more engaged positions. In one or more engaged positions, a bias lock and pivot surface may have one or more portions of a retraction spring therebetween. In one or more engaged positions, a bias lock and pivot surface may have one or more lock arms, elbows, engagement arms, or combination thereof located therebetween.

The pad clip may include one or more bias locks. The bias lock may assist in retaining a body portion within a pad clip when one or more retraction arms are moved in a brake apply and/or brake release direction. The bias lock may function to create a force within a channel of the pad clip, maintain the body portion fixed within a channel of the pad clip, limit movement of one or more segments of the body portion, allow limited movement of one or more retraction arms, or any combination thereof. One or more bias locks may produce sufficient force so the retraction spring is connected to the pad clip. One or more bias locks may include a single bias lock or a plurality of bias locks. A plurality of bias locks may be two opposing bias locks which cooperate together. One or more bias locks may be formed by one or more stops, tabs, surfaces, or any combination thereof of the pad clip. One or more bias locks may receive a holding force, an opposing holding force, or both. One or more bias locks may provide a counter force to a holding force, opposing holding force, or both within the channel of the pad clip so that the body portion connects the retraction spring to the pad clip. One or more bias locks may receive one or more portions of a retraction spring. One or more bias locks may receive one or more lock arms of the retraction spring. One or more bias locks may receive one or more portions of a retraction spring in one or more configurations. One or more bias locks may receive one or more portions of a retraction spring in one or more engaged positions. One or more bias locks may be free of contact with one or more portions of a retraction spring in one or more configurations. One or more bias locks may be free of contact with one or more portions of a retraction spring in an assembly position. An assembly lock may bias and/or retain one or more portions of a retraction spring away from a bias lock when the retraction spring is in an assembly position.

The disclosure further relates to a method of assembling one or more retraction spring assemblies. Assembling one or more retraction spring assemblies may include assembling one or more retraction springs to one or more pad clips. Assembling a retraction spring with a pad clip may include inserting one or more portions of a retraction spring into one or more openings, channels, or both of a pad clip. Assembling a retraction spring may include inserting one or more clip engagement portions in a spring window of the pad clip. Inserting a clip engagement portion may include compressing one or more legs, moving one or more legs toward one or more other legs, decreasing a leg distance, decreasing an engagement angle, or any combination thereof. Assembling a retraction spring may include engaging a clip engagement portion with a pad clip. Engaging a clip engagement portion may include releasing compression of one or more legs, moving one or more legs away from one or more other legs, increasing a leg distance, increasing an engagement angle, or any combination thereof. Assembling a retraction spring with a pad clip may include placing one or more portions of a retraction spring adjacent to one or more walls of a pad clip, between one or more channels of a pad clip, or both. Assembling a retraction spring with a pad clip may include locating one or more segments and/or elbows of a body portion adjacent to an upper wall, between an upper wall and lower wall, or both. Assembling a retraction spring with a pad clip may include locating one or more lock arms within a lock channel, between an inner wall and outer wall, on opposing sides of a bridge, between opposing bias locks, between opposing stops, within one or more assembly locks, within one or more pockets, or any combination thereof.

The method may include assembling a retraction spring assembly as part of a brake system. Assembling a retraction spring assembly as part of a brake system may include inserting one or more portions of a caliper, support bracket, pressure plate or any combination thereof into one or more channels of a pad clip. An abutment of a support bracket may be inserted into an abutment channel. A projection of a caliper may be inserted into a caliper channel. Assembling a retraction spring assembly may include configuring the retraction spring into an assembly position, one or more engagement positions, or both. Configuring the retraction spring into an assembly position may include placing an assembly aid on a retraction spring or may be free of placing an additional assembly aid on a retraction spring. Configuring the retraction spring into an assembly position may include located one or more portions of a retraction spring within one or more assembly locks. Configuring the retraction spring into an assembly position may include located on one or more lock arms, elbows, retraction arms, or combination thereof within one or more pockets. Configuring the retraction spring into one or more engagement positions may include removing an assembly aid from retraction spring, having one or more retraction arms contact one or more brake pads, or both.

Illustrative Embodiments

FIG. 1 illustrates a cross-section of a brake system 10. The brake system 10 includes a caliper 12, a support bracket 14, a rotor 16, and a retraction spring assembly 26. The retraction spring assembly 26 includes a retraction spring 18 and a pad clip 20. The retraction spring assembly 26 extends over the rotor 16. The rotor 16 is located between a pair of opposing brake pads 22. Each of the brake pads 22 includes a pressure plate 24 with friction material 25 affixed thereto. Each pressure plate 24 is adjacent to a piston 36. The opposing pistons 36 are located in piston bores 38. The upper surface 32 of each piston 36 defines an upper boundary 44 on each pressure plate 24. The lower surface 34 of each piston 36 defines a lower boundary 46 on each pressure plate 24. The region between the upper and lower boundaries 44 and 46 of each pressure plate 24 is a contact region 45. Retraction arms 28 of the retraction spring 18 are in contact with the opposing pressure plates 24 within the contact region 45. The contact surface between each retraction arm 28 and pressure plate 24 is referred to as a reaction point 30.

Figure 2:
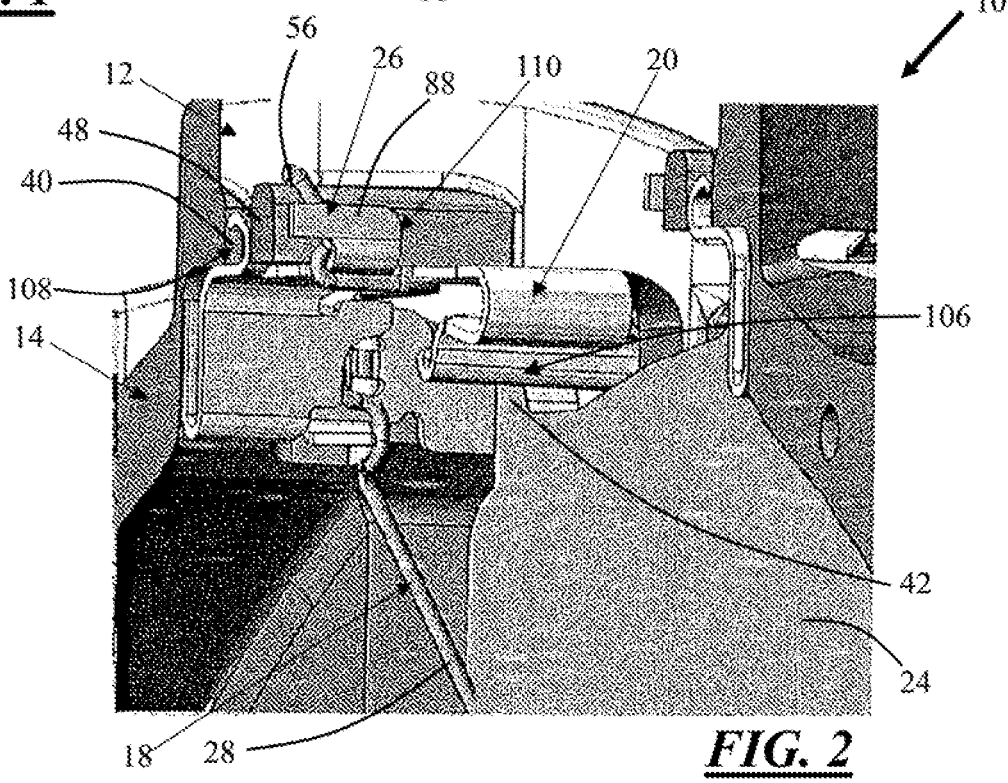
FIG. 2 is an angled cross-section of a brake system along section A-A of FIG. 1.

FIG. 2 illustrates the retraction spring assembly 26 assembled in a brake system 10. The retraction spring assembly 26 includes a retraction spring 18. The retraction spring 18 includes a retraction arm 28 in contact with a pressure plate 24. The pressure plate 24 includes an ear 42. The ear 42 resides within an ear channel 106 of the pad clip 20. The pad clip 20 is also engaged with the support bracket 14. The support bracket 14 includes an abutment 40. The abutment 40 resides within an abutment channel 108 of the pad clip 20. The pad clip 20 includes a caliper channel 110. Residing within the caliper channel 110 is a projection 48 of the caliper 12. Also located within the caliper channel 110 is a clip engagement portion 56 of the retraction spring 18. The clip engagement portion 56 is located between the projection 48 and an anti-rotation tab 88 of the pad clip 20.

Figure 3:
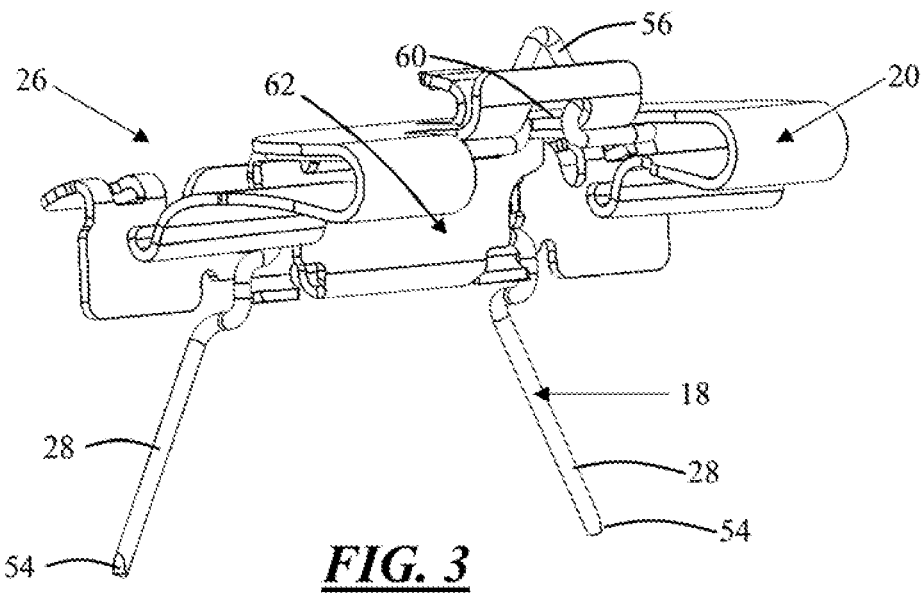
FIG. 3 is a perspective view of a retraction spring assembly.

FIG. 3 illustrates a perspective view of a retraction spring assembly 26. The retraction spring assembly 26 includes a retraction spring 18 seated in a pad clip 20. The retraction spring 18 includes a clip engagement portion 56 extending through a spring window 60 of the pad clip 20. The spring window 60 is formed in a bridge 62 of the pad clip 20. The retraction spring 18 includes opposing retraction arms 28.

The retraction arms 28 are on opposite sides of the bridge 62 of the pad clip 20. The retraction arms 28 include contact surfaces 54.

Figure 4A:
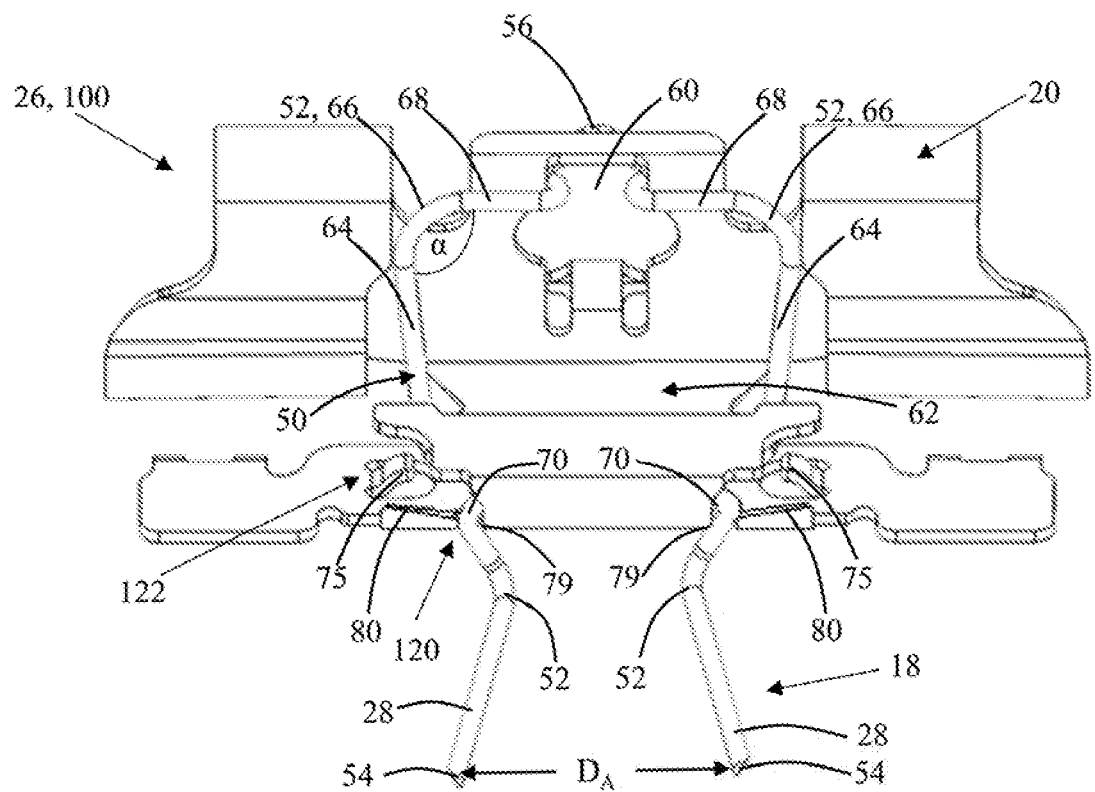
FIG. 4A is an elevation view of the underside of a retraction spring assembly in an assembly position.

FIG. 4A illustrates a planar view of the retraction spring assembly 26 in an assembly position 100 of the retraction spring 18. The clip engagement portion 56 extends through the spring window 60. The clip engagement portion 56 is part of a body portion 50 of the retraction spring 18. The body portion 50 includes a plurality of elbows 52. The elbows 52 connect connection segments 64 to body segments 68 of the body portion 50. The elbows 52 are also energy storage portions 66. The energy storage portions 66 retain energy when the retraction spring 18 is compressed into the assembly position 100. To compress the retraction spring 18 into an assembly position 100, the retraction arms 28 are biased toward one another so that an arm distance $D_A$ decreases. An assembly aid (not shown), such as a tie or clamp may bias the retraction arms 28 toward one another. The retraction arms 28 are connected to lock arms 70 of the body portion 50 via elbows 52. In the assembly position 100, the lock arms 70 are biased toward one another and the bridge 62. In the assembly position 100, the lock arms 70 reside within inner pockets 79 of the pad clip 20. The inner pockets 79 form an assembly lock 120 by retaining the lock arms 70 biased toward one another in the assembly position 100. In the assembly position 100, the lock arms 70 are distanced from and free of contact with stops 75. An assembly angle α is formed between each connection segment 64 and respective body segment 68. In the assembly position 100, each connection segment 64 angles toward the adjacent body segment 68 so that the assembly angle α is a substantially acute angle.

Figure 4B:
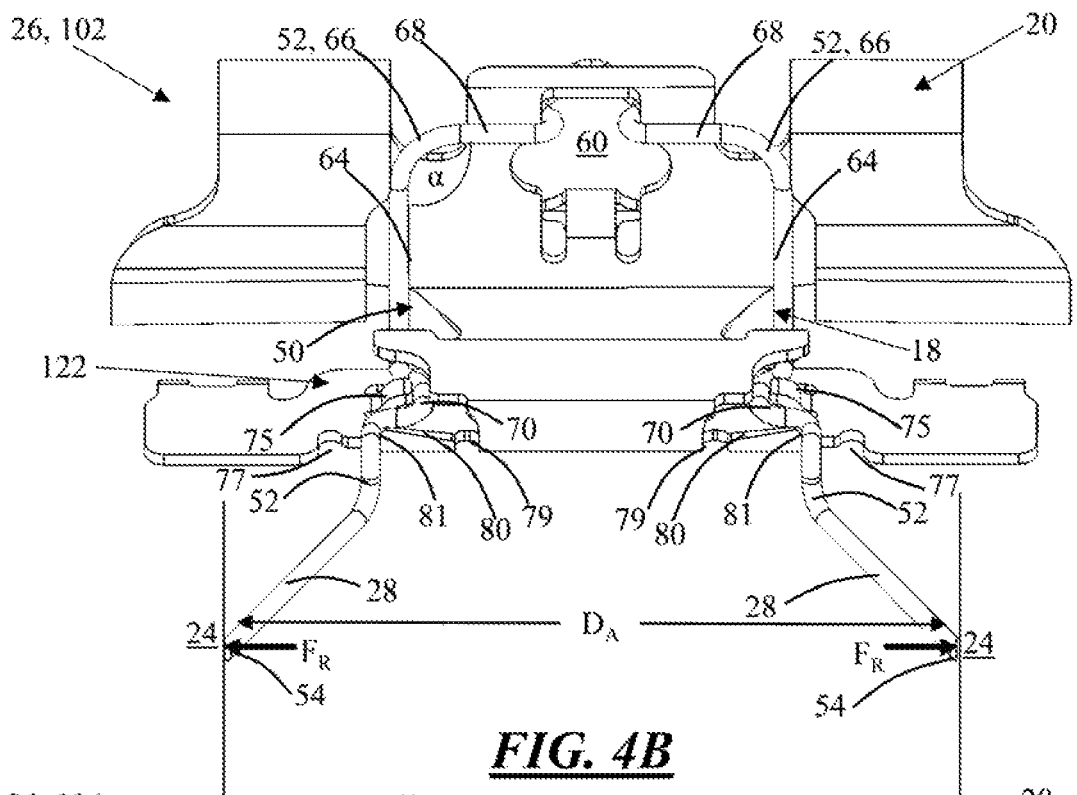
FIG. 4B is an elevation view of the underside of a retraction spring assembly in a brake release position.

FIG. 4B illustrates a planar view of the retraction spring assembly 26 in a brake release position 102 of the retraction spring 18. To deflect the retraction spring 18 into a brake release position 102, such as from an assembly position 100 (not shown), the retraction arms 28 are deflected into contact with opposing pressure plates 24. The arm distance $D_A$ is greater in the brake release position 102 than in the assembly position 100. The contact surfaces 54 are in contact with the pressure plates 24. In the brake release position 102, the retraction arms 28 apply a brake release force $F_R$ to the opposing pressure plates 24. The brake release force $F_R$ is toward the pressure plates 24. In the brake release position 102, the lock arms 70 are deflected away from one another and the bridge 62. In the brake release position 102, the lock arms 70 are in contact with the stops 75. Each stop 75 is a bias lock 122. In the brake release position 102, the lock arms 70 may reside within outer pockets 77 of the pad clip 20. To move from the assembly position 100 to the brake release position 102, the lock arms 70 move away from each other and along respective engagement ramps 80 to be adjacent a pivot surface 81 of the engagement ramp 80. In the brake release position 102, each connection segment 64 angles from the adjacent body segment 68 so that the assembly angle α is larger than in the assembly position 100. The assembly angle α may be generally perpendicular in the brake release position 102.

Figure 4C:
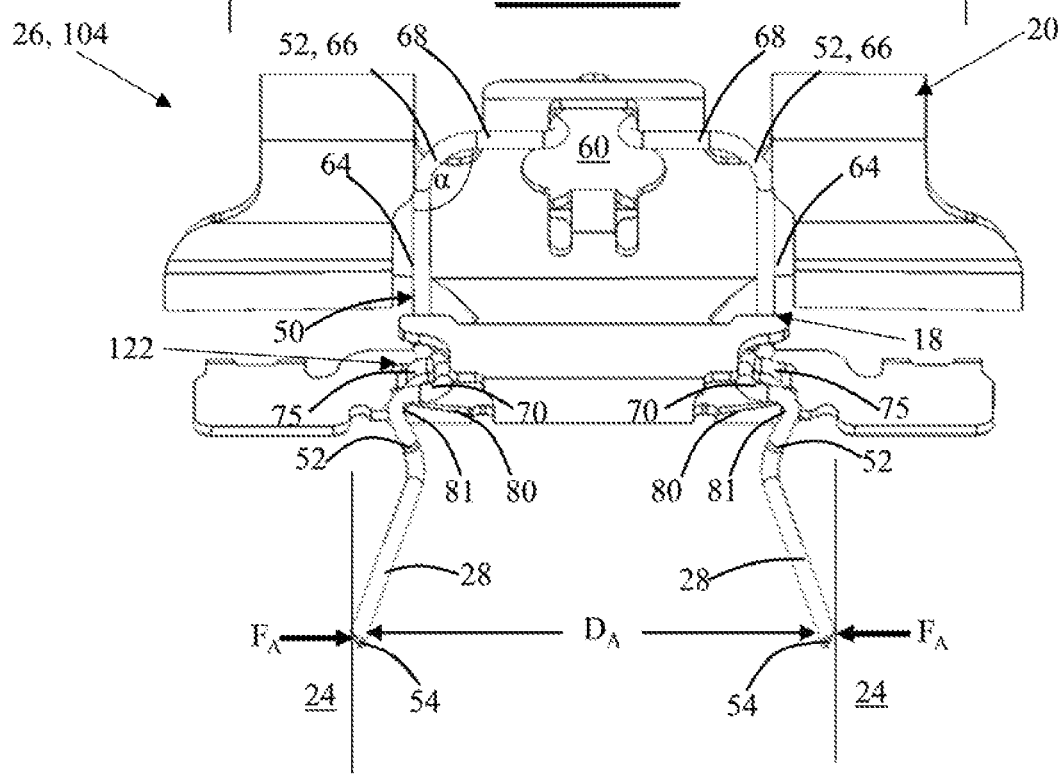
FIG. 4C is an elevation view of the underside of a retraction spring assembly in a brake apply position.

FIG. 4C illustrates a planar view of the retraction spring assembly 26 in a brake apply position 104 of the retraction spring 18. In the brake apply position 104, the pressure plates 24 move toward one another. The contact surfaces 54 of the retraction arms 28 are in contact with the pressure plates 24. In the brake apply position 104, the opposing pressure plates 24 apply a brake apply force $F_A$ to the contact surfaces 54 and compress the retraction arms 28 toward one another. The elbows 52 between the retraction arms 28 and the lock arms 70 allow the retraction to compress toward one another. The arm distance $D_A$ is lesser in the brake apply position 104 than in the brake release position 102. The arm distance $D_A$ is greater in the brake apply position 104 than in the assembly position 100. In the brake apply position 104, the pivot surfaces 81 and engagement ramps 80 deflect the lock arms 70 away from one another and the bridge 62. As the lock arms 70 are held relatively steady in the brake apply position 104 compared to the brake release position 102, the assembly angle α remains substantially the same between the brake apply position 104 and the brake release position 102.

Figure 5A:
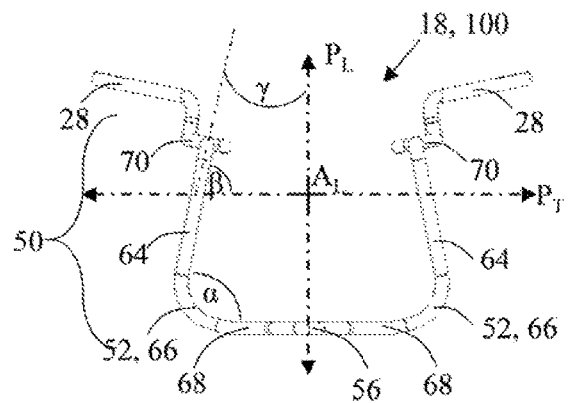
FIG. 5A is a plan view of the top of a retraction spring in an assembly position.
Figure 5B:
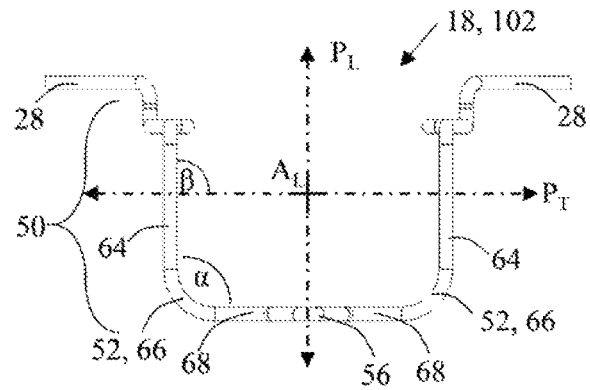
FIG. 5B is a plan view of the top of a retraction spring in a brake release position.

FIG. 5A illustrates a top plan view of a retraction spring 18 in an assembly position 100 and FIG. 5B illustrates a top plan view of the retraction spring 18 in a brake release position 102. The retraction spring 18 includes a body portion 50. The body portion 50 includes a clip engagement portion 56, body segments 68, connection segments 64, and lock arms 70. The body portion 50 is connected to opposing retraction arms 28. The two body segments 68 have the clip engagement portion 56 therebetween. The connection segments 64 are integrally connected to the body segments 68 via elbows 52. The elbows 52 are also energy storage portions 66. A longitudinal plane $P_L$ is located centrally between the connection segments 64 and passes though the center of the clip engagement portion 56. The retraction spring 18 is substantially symmetrical about the longitudinal plane $P_L$. Intersecting the longitudinal plane $P_L$ at a longitudinal axis $A_L$ is a transverse plane $P_T$. The transverse plane $P_T$ is generally parallel with the body segments 68. A transverse connection segment angle θ is formed between the connection segment 64 and transverse plane $P_T$. In the assembly position 100, the transverse connection segment angle θ is smaller than in the brake release position 102. The transverse connection segment angle θ is substantially the same as the assembly angle α. In the assembly position 100, each connection segment 64 forms a longitudinal connection segment angle γ relative to the longitudinal plane $P_L$. In the brake release position 102, the connection segments 64 are substantially parallel with the longitudinal plane $P_L$. In the brake release position 102, the retraction arms 28 are generally parallel with the transverse plane $P_T$.

Figure 6:
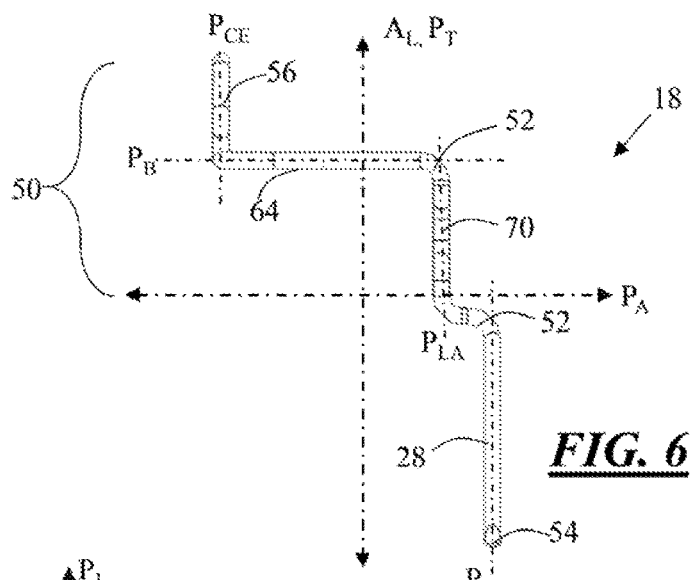
FIG. 6 is a side elevation view of a retraction spring.

FIG. 6 illustrates a side elevation view of a retraction spring 18. The retraction spring 18 includes a body portion 50. The body portion 50 includes a clip engagement portion 56 integrally connected to connection segment 64. The clip engagement portion 56 forms a clip engagement plane $P_{CE}$. The connection segments 64 form part of a body plane $P_B$. The clip engagement plane $P_{CE}$ extends generally perpendicular relative to the body plane $P_B$. The clip engagement plane $P_{CE}$ is generally parallel with the transverse plane $P_T$ and longitudinal axis $A_L$. The transverse plane $P_T$ is located about midway between the clip engagement portion 56 and the retraction arms 28. The body portion 50 further includes lock arms 70. Each lock arm 70 is integrally connected to a connection segment 64 via an elbow 52. The lock arms 70 form a lock arm plane $P_{LA}$. The lock arm plane $P_{LA}$ is generally perpendicular with the body plane $P_B$ and the lateral plane $P_A$. The lateral plane $P_A$ is located about midway between an end of the clip engagement portion 56 and an end of the retraction arms 28. The lock arm plane $P_{LA}$ is generally parallel with the transverse plane $P_T$, longitudinal axis $A_L$, and clip engagement plane $P_{CE}$. The lock arm plane $P_{LA}$ is located at an opposite end of the connection segments 64 as the clip engagement plane $P_{CE}$. Each lock arm 70 is integrally connected to a retraction arm 28 via an elbow 52. The retraction arms 28 are co-planar and form a retraction arm plane $P_{RA}$. The retraction arm plane $P_{RA}$ is generally perpendicular with the body plane $P_B$ and the lateral plane $P_A$. The retraction arms 28 are located on an opposing side of the lateral plane $P_A$ as the body portion 50. The retraction arm plane $P_{RA}$ is generally parallel with the clip engagement plane $P_{CE}$, longitudinal axis $A_L$, transverse plane $P_T$, and lock arm plane $P_A$. At the free end of each retraction arm 28, opposite the elbow 52, is a contact surface 54.

Figure 7A:
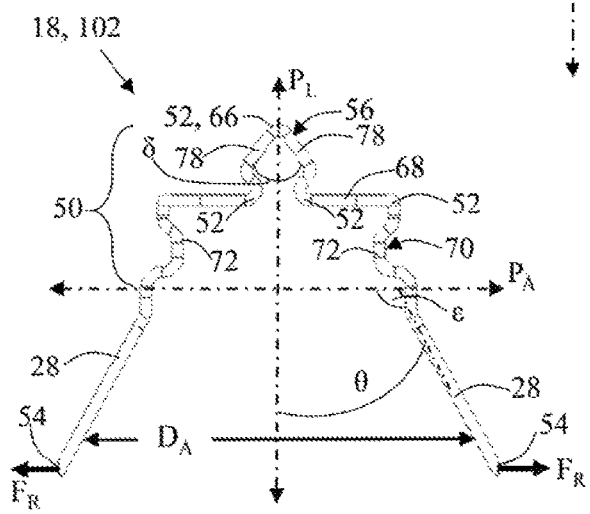
FIG. 7A is a front elevation view of a retraction spring in a brake release position.
Figure 7B:
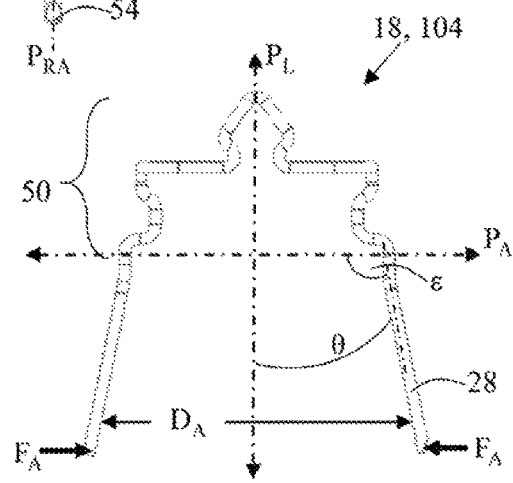
FIG. 7B is a front elevation view of a retraction spring in a brake apply position.

FIG. 7A illustrates a front elevation of the retraction spring 18 in a brake release position 102 and FIG. 7B illustrates a front elevation of the retraction spring 18 in a brake apply position 104. The retraction spring 18 includes a body portion 50. The body portion 50 includes a clip engagement portion 56, body segments 68, and lock arms 70 integrally connected to one another via elbows 52. The clip engagement portion 56 includes two legs 78 integrally connected to one another via an elbow 52. The two legs 78 form an engagement angle δ therebetween. The elbow 52 is also an energy storage portion 66. The two legs 78 are substantially symmetrical about the longitudinal plane $P_L$. The two legs 78 extend toward and are connected to respective body segments 68 via elbows 52. The body segments 68 are located on opposing sides of the longitudinal plane $P_L$. The body segments 68 are substantially parallel with the lateral plane $P_A$. The lock arms 70 are substantially symmetrical about the longitudinal plane $P_L$. Each lock arm 70 includes a lock bend segment 72. Each lock bend segment 72 is an inward curvature of the lock arm 70 toward the longitudinal plane $P_L$. Each lock arm 70 is integrally connected to a retraction arm 28 via an elbow 52. The body portion 50 is located on an opposite side of the lateral plane $P_A$ as the retraction arms 28. On a free end of each retraction arm 28, opposite the elbows 52, is a contact surface 54. Each contact surface 54 is substantially planar. The retraction arms 28 are distanced from one another at an arm distance $D_A$. In the brake release position 102, the arm distance $D_A$ is greater than in the brake apply position 104. To compress into the brake apply position 104 from the brake release position 102, the retraction arms 28 are compressed toward one another by receiving a brake apply force $F_A$. When the brake apply force $F_A$ is removed, the retraction arms 28 apply a brake release force $F_R$. The retraction arms 28 form a lateral retraction angle ε relative to the lateral plane. The lateral retraction angle ε is smaller in the brake apply position 104 than in the brake release position 102. The retraction arms 28 form a longitudinal retraction angle θ relative to the longitudinal plane $P_L$. The longitudinal retraction angle θ is smaller in the brake apply position 104 than in the brake release position 102.

Figure 8:
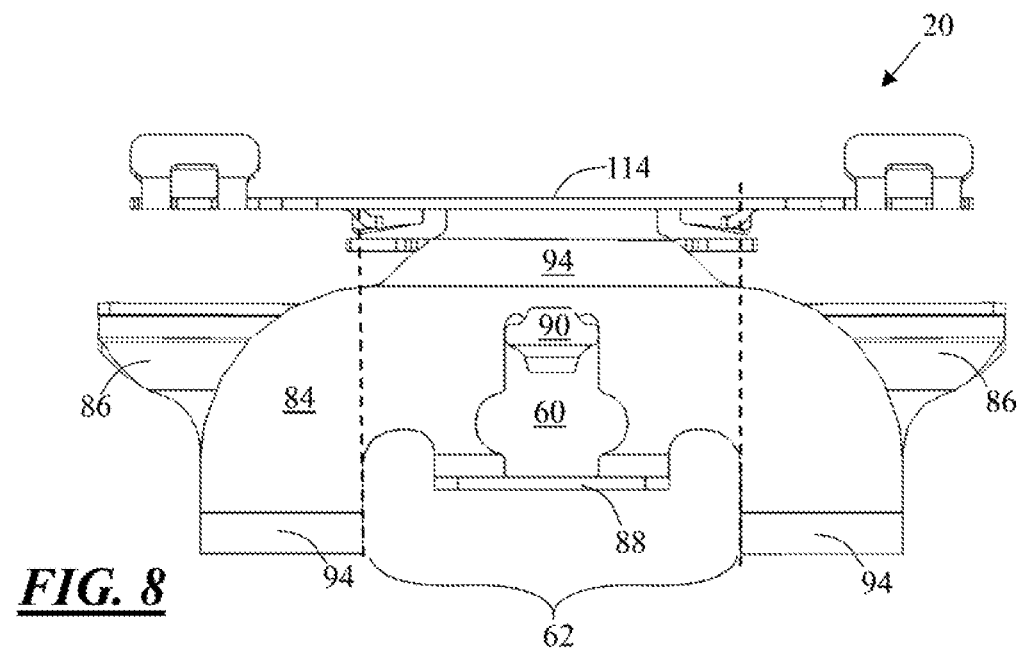
FIG. 8 is a plan view of a top of a pad clip.
Figure 9:
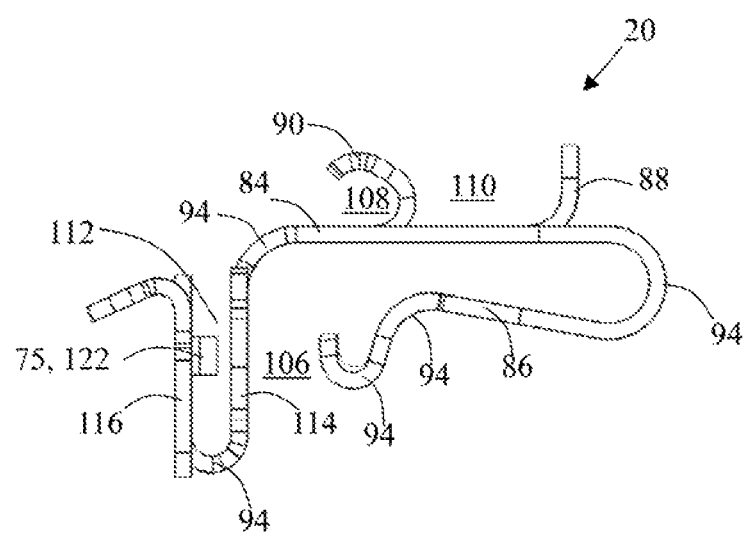
FIG. 9 is a side elevation view of a pad clip.

FIG. 8 is a plan view of a top of a pad clip 20 and FIG. 9 is a side elevation view of the pad clip 20. The pad clip 20 includes an upper wall 84. Projecting away from the upper wall 84 is an anti-rotation tab 88 and support tab 90. The support tab 90 curves away from the anti-rotation tab 88 to form an abutment channel 108. The distance between the support tab 90 and the anti-rotation tab 88 forms a caliper channel 110. The upper wall 84 includes a spring window 60. The spring window 60 is located between the anti-rotation tab 88 and the support tab 90. The upper wall 88 is integrally connected to a lower wall 86 via an arcuate wall 94. The lower wall 86 is angled toward the upper wall 84. At the end of the lower wall 86 are a plurality of arcuate walls 94. The end of the lower wall 86 is distanced from an inner wall 114 to form an ear channel 106. The inner wall 106 is integrally connected to the upper wall 84 via an arcuate wall 94. The inner wall 114 is generally perpendicular to the upper wall 84. The inner wall 106 is integrally connected to an outer wall 116. The outer wall 116 is generally parallel to the inner wall 116. The distance between the outer wall 116 and the inner wall 114 forms a lock channel 112. Projecting from the inner wall 114 are stops 75. The pad clip 20 is substantially symmetrical about a bridge 62. The bridge 62 is the central portion from the upper wall 84 to the outer wall 104. The arcuate wall 94 between the upper wall 84 and the lower wall 86 is free of material at the bridge 62. The lower wall 86 bifurcates from the arcuate wall 94 and the upper wall 84 such that the lower wall 86 is free of material at the bridge 62.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition." Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for aid purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A retraction spring assembly comprising:
   a) a pad clip having:
      i) a lock channel;
      ii) one or more assembly locks;
   b) a retraction spring affixed to the pad clip, wherein the retraction spring stores energy during a brake apply and releases the energy during a brake release and comprises:
      i) a body portion having two or more lock arms residing within the lock channel, and a plurality of energy storage portions;
      ii) a first retraction arm and a second retraction arm, each integrally connected to the body portion via one of the plurality of energy storage portions;
      wherein the one or more assembly locks are configured to receive the two or more lock arms and bias the retraction spring into an assembly position in which the first retraction arm and the second retraction arm biased toward each other;
      during the brake apply, movement of the first retraction arm and the second retraction arm is toward each other, toward a rotor, or toward both and results in the energy being stored in the body portion;
      wherein during the brake release, the energy stored in the body portion is released and transferred to both the first retraction arm and the second retraction arm to result in movement of the first retraction arm and the second retraction arm away from each other, away from the rotor, or away from both; and
      wherein the one or more assembly locks are located adjacent to one more engagement aids of the pad clip which guide the one or more lock arms away from the assembly position into one or more engaged positons.

2. The retraction spring assembly of claim 1, wherein the one or more assembly locks include two or more pockets formed in one or more walls of the pad clip.

3. The retraction spring assembly of claim 1, wherein the one or more engagement aids include one or more flanges projecting from one or more walls of the pad clip.

4. The retraction spring assembly of claim 3, wherein the one or more flanges include one or more ramp surfaces which slope away from the one or more assembly locks of the pad clip.

5. The retraction spring assembly of claim 1, wherein the one or more engagement aids include one or more pivot surfaces; and
   wherein the retraction spring is configurable into the one or more engaged positions during the brake apply and the brake release in which the two or more lock arms are located adjacent to and in contact with the one or more pivot surfaces.

6. The retraction spring assembly of claim 1, wherein the one or more assembly locks include two or more assembly locks and the one or more engagement aids include two or more engagement aids; and
   wherein the two or more assembly locks and the two or more engagement aids include a bridge of the pad clip therebetween.

7. The retraction spring assembly of claim 1, wherein the retraction spring is configurable into the assembly position in which the two or more lock arms are deflected about at least a portion of the plurality of energy storage portions so that the two or more lock arms are biased toward each other.

8. The retraction spring assembly of claim 1, wherein the retraction spring is configurable into the one or more engaged positions during the brake apply and the brake release in which the two or more lock arms are engaged with two or more bias locks of the pad clip so that the body portion is held substantially fixed relative to the pad clip.

9. The retraction spring assembly of claim 8, wherein the two or more bias locks are two or more stops which project from one or more walls of the pad clip.

10. The retraction spring assembly of claim 9, wherein the one or more walls also have the one or more assembly locks formed therein.

11. The retraction spring assembly of claim 8, wherein one of the two or more lock arms provides a holding force toward one of the two or more bias locks and which fixes the one of the two or more lock arms to the one of the two or more bias locks; and
    wherein another of the two or more lock arms provides an opposing holding force opposite the holding force and toward another of the two or more bias locks and which fixes the another of the two or more lock arms to the another of the two or more bias locks.

12. The retraction spring assembly of claim 1, wherein the pad clip includes a spring window through one or more walls.

13. The retraction spring assembly of claim 12, wherein the body portion of the retraction spring includes a clip engagement portion extending through the spring window.

14. The retraction spring assembly of claim 1, wherein a brake system comprises two or more of the retraction spring assemblies;
    wherein the brake system includes one or more support brackets, two or more opposing brake pads having the rotor therebetween, and two or more opposing pistons having the two or more opposing brake pads therebetween; and
    wherein the first retraction arm and the second retraction arm of each of the retraction springs are in contact with an inner surface of one of the two or more opposing brake pads.

15. A retraction spring assembly comprising:
    a) a pad clip having:
       i) a lock channel;
       ii) one or more assembly locks;
    b) a retraction spring affixed to the pad clip, wherein the retraction spring stores energy during a brake apply and releases the energy during a brake release and comprises:
       i) a body portion having two or more lock arms residing within the lock channel, and a plurality of energy storage portions;

ii) a first retraction arm and a second retraction arm, each integrally connected to the body portion via one of the plurality of energy storage portions;

wherein the one or more assembly locks are configured to receive the two or more lock arms and bias the retraction spring into an assembly position in which the first retraction arm and the second retraction arm biased toward each other;

during the brake apply, movement of the first retraction arm and the second retraction arm is toward each other, toward a rotor, or toward both and results in the energy being stored in the body portion, wherein during the brake release, the energy stored in the body portion is released and transferred to both the first retraction arm and the second retraction arm to result in movement of the first retraction arm and the second retraction arm away from each other, away from the rotor, or away from both;

wherein the retraction spring is configurable into one or more engaged positions during the brake apply and the brake release in which the two or more lock arms are engaged with two or more bias locks of the pad clip so that the body portion is held substantially fixed relative to the pad clip, wherein the retraction spring and the pad clip are both substantially symmetrical about a longitudinal plane of the retraction spring so that the first retraction arm is opposite the second retraction arm; and wherein the first retraction arm and the second retraction arm extend away from the longitudinal plane at a substantially acute angle in the one or more engaged positions.

16. A brake system comprising:
a) one or more retraction spring assemblies having:
   i) one or more pad clips having a lock channel and one or more assembly locks; and
   ii) one or more retraction springs engaged with the one or more pad clips, wherein the one or more retraction springs include:
      a body portion having two or more lock arms residing within the lock channel of the pad clip, and a plurality of energy storage portions;
      a first retraction arm and a second retraction arm, each integrally connected to one of the two or more lock arms via one of the plurality of energy storage portions;
b) two or more pistons which are opposing one another, wherein each piston includes:
   i) an apply end facing toward a rotor gap;
   ii) a height defined by a distance between an upper surface and a lower surface of each of the two or more pistons;
c) two or more brake pads with the rotor gap therebetween, each having a contact region across a width of an inner surface of the brake pad which is defined by the upper surface and the lower surface of at least one of the two or more pistons which are adjacent;

wherein the retraction spring stores energy during a brake apply and releases the energy during a brake release;

wherein the retraction spring is configurable into one or more engaged positions during the brake apply and the brake release so that the first retraction arm and the second retraction arm are each in direct contact with one of the inward facing surfaces of at least one of the two or more brake pads within the contact region; and wherein the one or more assembly locks are configured to receive the two or more lock arms and bias the retraction spring into an assembly position in which the first retraction arm and the second retraction arm are biased toward each other and free of contact with the inward facing surfaces of the two or more brake pads.

17. The brake system of claim 16, wherein the one or more pad clips include one or more engagement aids adjacent to the one or more assembly locks; and wherein the one or more engagement aids guide the two or more lock arms away from the one or more assembly locks from the assembly position toward the one or more engaged positions.

18. The brake system of claim 16, wherein the one or more pad clips include one or more bias locks and in the one or more engaged positions the two or more lock arms are engaged with the one or more bias locks so that the body portion is held substantially fixed relative to the one or more pad clips.

19. The brake system of claim 18, wherein during the brake apply, movement of the two or more brake pads toward each other results in movement of the first retraction arm and the second retraction arm toward each other, toward the rotor gap, toward a rotor, or a combination thereof and results in the energy being stored in the body portion; and wherein during the brake release, the energy stored in the body portion is released and transferred to both the first retraction arm and the second retraction arm to result in movement of the first retraction arm and the second retraction arm away from each other, away from the rotor gap, away from the rotor, or a combination thereof and the two or more brake pads moving away from each other.

20. The brake system of claim 16, wherein the one or more assembly locks of the one or more pad clips include two or more pockets formed in one or more walls of the one or more pad clips.

\* \* \* \* \*

UNITED STATES PATENT AND TRADEMARK OFFICE
CERTIFICATE OF CORRECTION

Page 1 of 1

PATENT NO.        : 10,968,967 B2
APPLICATION NO.   : 16/187048
DATED             : April 6, 2021
INVENTOR(S)       : Brad Robert Lethorn It is certified that error appears in the above-identified patent and that said Letters Patent is hereby corrected as shown below:

In the Claims

Column 29, Line 49 Claim 1 Insert -- or -- after "adjacent to one"

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*